US006941228B2

(12) United States Patent
Toelle

(10) Patent No.: US 6,941,228 B2
(45) Date of Patent: Sep. 6, 2005

(54) METHOD AND SYSTEM AND PROGRAM STORAGE DEVICE FOR ANALYZING COMPRESSIONAL 2D SEISMIC DATA TO IDENTIFY ZONES OF OPEN NATURAL FRACTURES WITHIN ROCK FORMATIONS

(75) Inventor: Brian Edward Toelle, Oakdale, PA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 80 days.

(21) Appl. No.: 10/729,759

(22) Filed: Dec. 5, 2003

(65) Prior Publication Data

US 2005/0125157 A1 Jun. 9, 2005

(51) Int. Cl.[7] .............................................. G01V 1/28
(52) U.S. Cl. ........................................ 702/17; 702/16
(58) Field of Search ........................... 702/14, 16, 17, 702/18; 367/73

(56) References Cited

U.S. PATENT DOCUMENTS

| | | | | |
|---|---|---|---|---|
| 5,724,309 A | * | 3/1998 | Higgs et al. ................... | 367/48 |
| 5,850,622 A | * | 12/1998 | Vassiliou et al. ............. | 702/17 |
| 5,870,691 A | * | 2/1999 | Partyka et al. ................ | 702/16 |
| 6,131,071 A | * | 10/2000 | Partyka et al. ................ | 702/16 |
| 2002/0185329 A1 | | 12/2002 | Goloshubin et al. | |
| 2004/0254730 A1 | * | 12/2004 | Najmuddin ..................... | 702/2 |

FOREIGN PATENT DOCUMENTS

WO    WO 03/064702 A1    8/2003

OTHER PUBLICATIONS

"Detecting Fracture Zones in the Austin Chalk Using Seismic P-Wave Data" Houston Geological Society Bulletin, Sep. 2001 by Ilyas Najmuddin.
"Frequency Attenuation: A Fracture Indicator" Houston Geological Society Bulletin Mar. 2001 by Ilyas Najmuddin.

* cited by examiner

Primary Examiner—Donald McElheny, Jr.
(74) Attorney, Agent, or Firm—Danita Maseles; Brigitte L. Echols; Dale Gaudier

(57) ABSTRACT

The Fracture Trend Identification method is practiced by the Fracture Trend Identification software adapted for analyzing compressional 2-D seismic data in order to identify zones in a rock formation containing open, natural fractures. The Fracture Trend Identification method comprises one or two or more of the following steps: loading seismic data into the workstation software and visually quality controlling it, and then generating variance sections and reviewing them visually to identify faulting, identifying seismic events that corresponds to a formation of interest, extracting seismic attribute data from various zones of the seismic events, identifying frequency anomalies by interpreting the extracted seismic attribute data of the various zones of the seismic events, identifying and removing any potentially false positive frequency anomalies, and confirming any remaining ones of the anomalies not removed during the removing step and ranking the confirmed ones of the remaining anomalies. The method for identifying the seismic events that correspond to the formation of interest may comprise the extraction of a seismic wavelet and the performance of a well to seismic tie through the generation of the synthetic. The extraction of seismic attribute data from various zones may comprise the generation of the seismic Dominant Frequency attribute. Interpreting the extracted data for the various zones may comprise the posting of attribute values on a ribbon posting map and the examination of these values for rapid shifts in frequencies from higher to lower frequencies. The identification and removal of potential false positives may comprise the extraction and examination of a Dominant Frequency for a near surface seismic event and comparison with those of the zone(s) of interest. The confirmation of any remaining ones of the anomalies not removed during the removing step and ranking the confirmed ones of the remaining anomalies may comprise the extraction and examination of the seismic frequency spectrums from selected zones above, below, and including the frequency attenuation zones.

20 Claims, 18 Drawing Sheets

METHOD AND SYSTEM AND PROGRAM STORAGE DEVICE FOR ANALYZING COMPRESSIONAL 2D SEISMIC DATA TO IDENTIFY ZONES OF OPEN NATURAL FRACTURES WITHIN ROCK FORMATIONS

BACKGROUND OF THE INVENTION

The subject matter of the present invention relates to a workstation software method and system and program storage device adapted for locating naturally occurring, open fractures in rock formations using compressional (p-wave) 2-D seismic data.

Geophysicists use compressional 2-D seismic data to locate zones of faulting that may play important roles in the trapping of hydrocarbons. The reservoirs in which hydrocarbons have historically been located include clastics (sandstones, etc.) and carbonates (limestones, dolomites, etc. . . . ). Since the location of hydrocarbons has become more difficult, nonstandard reservoirs and trapping mechanisms have become increasingly important as targets of exploration and development. Traditional compressional 2-D seismic interpretations techniques use the time, amplitude and velocity attributes of the seismic data to recognize and map structural and stratigraphic features. Sudden vertical displacements of seismic horizons are often interpreted as faulting. Fractures are structural failures of the rock formation but without vertical or horizontal displacement. These features are not recognizable with traditional seismic interpretation methods. Fractures do, however, influence another seismic attribute, i.e. frequency, by attenuating higher frequencies. Extracting and comparing both the dominant frequency and the frequency spectra from a number of intervals located above and below and containing the formation of interest can recognize this frequency attenuation.

SUMMARY OF THE INVENTION

One aspect of the present invention involves a fracture trend identification method adapted for analyzing compressional 2-D seismic data to identify zones containing open natural fractures comprising the steps of: (a) loading seismic data into a workstation, and then identifying zones of faulting in an area of interest; (b) identifying seismic events that corresponds to a formation of interest; (c) extracting seismic attribute data from various zones of the seismic events and identifying frequency anomalies by interpreting the extracted seismic attribute data for the various zones of the seismic events; (d) identifying and removing (i.e., filtering) any potential false positive frequency anomalies; and (e) confirming any remaining ones of the anomalies not removed during the removing step and ranking the remaining, confirmed anomalies.

Another aspect of the present invention associated with the fracture trend identification method involves a method adapted for identifying zones of faulting in an area of interest comprising the steps of: generating variance sections and examining them visually to identify zones of high variance.

Another aspect of the present invention associated with the fracture trend identification method involves a method adapted for identifying seismic events that correspond to a formation of interest comprising the step of: extracting a seismic wavelet and performing a well to seismic tie through the generation of a synthetic.

Another aspect of the present invention associated with the fracture trend identification method involves a method adapted for extracting seismic attribute data from various zones of the seismic events comprising the step of: generating seismic Variance and Dominant Frequency attributes.

Another aspect of the present invention associated with the fracture trend identification method involves a method adapted for identifying frequency anomalies by interpreting the extracted seismic attribute data for the various zones of the seismic events comprising the steps of: posting attribute values on a ribbon posting map, and examining these values for rapid shifts in frequencies from higher to lower frequencies.

Another aspect of the present invention associated with the fracture trend identification method involves a method adapted for identifying and removing potential false positive frequency anomalies comprising the steps of: extracting and examining a Dominant Frequency for a near surface seismic event, and comparing that Dominant Frequency with the Dominant Frequencies of the zone(s) of interest.

Another aspect of the present invention associated with the fracture trend identification method involves a method adapted for confirming any remaining anomalies not previously removed during the removing step and ranking the confirmed ones of the remaining anomalies comprising the step of: extracting and examining the seismic frequency spectrums from selected zones above, below and including the frequency attenuation zones.

Another aspect of the present invention involves a program storage device readable by a machine adapted for storing a set of instructions executable by the machine to perform method steps for analyzing compressional 2-D seismic data to identify zones containing open natural fractures in an Earth formation, the method steps comprising: (a) identifying seismic events that correspond to a formation of interest; (b) extracting seismic attribute data from various zones of the seismic events; (c) identifying frequency anomalies by interpreting the extracted seismic attribute data of the various zones of the seismic events; (d) identifying and removing any potential false positive frequency anomalies; and (e) confirming any remaining ones of the anomalies not removed during the removing step and ranking the confirmed ones of the remaining anomalies.

Another aspect of the present invention involves a fracture trend identification system adapted for analyzing compressional 2-D seismic data to identify zones containing open natural fractures, comprising: apparatus adapted for identifying seismic events that corresponds to a formation of interest; apparatus adapted for extracting seismic attribute data from various zones of the seismic events; apparatus adapted for identifying frequency anomalies by interpreting the extracted seismic attribute data for the various zones of the seismic events; apparatus adapted for identifying and removing any potential false positive frequency anomalies; and apparatus adapted for confirming any remaining ones of the anomalies not removed and ranking the confirmed ones of the remaining anomalies.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented herein below, and the accompanying drawings, which are given by way of illustration only and are not intended to be limitative of the present invention, and wherein.

DETAILED DESCRIPTION

Figure 1:
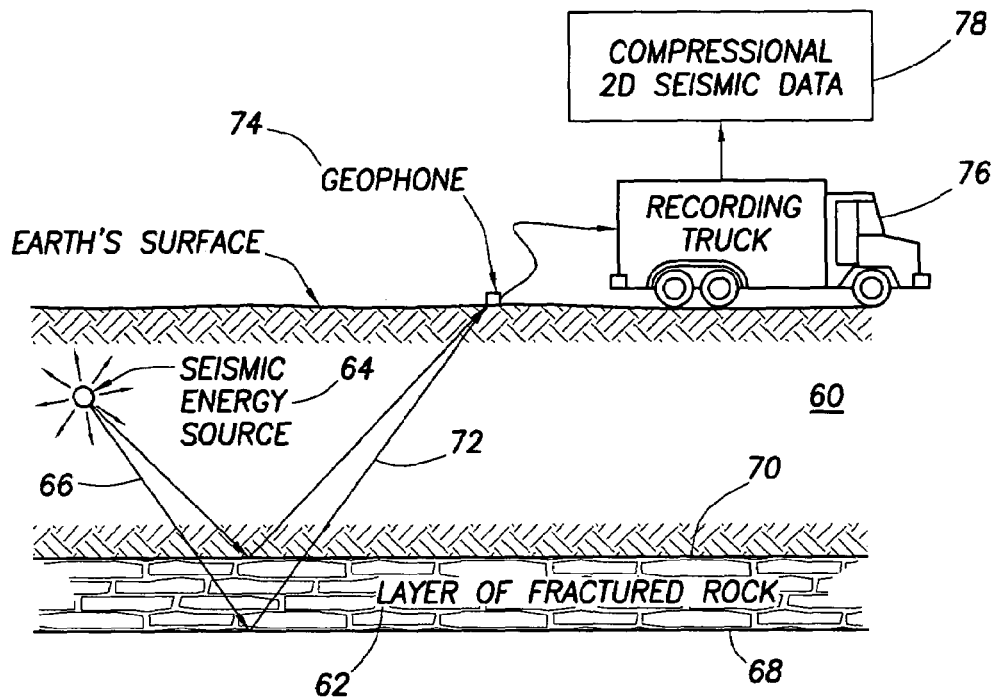
FIG. 1 illustrates a seismic energy source generating an acoustic energy wave in an Earth formation, the receipt of a reflected acoustic energy wave in a surface or subsurface geophone and the generation and recordation of compressional 2D seismic data.

The Fracture Trend Identification method is practiced by the Fracture Trend Identification software of the present invention for analyzing compressional 2-D seismic data to identify zones within subsurface rock formations containing open, natural fractures. The Fracture Trend Identification method of the present invention, which analyzes compressional 2-D seismic data to identify zones within subsurface rock formations containing open, natural fractures, comprises one or more of the following steps: (a) loading seismic data into a workstation software and visually quality controlling it, variance section generation, and then identifying zones of faulting in an area of interest; (b) identifying seismic events that corresponds to a formation of interest; (c) extracting seismic attribute data from various zones of the seismic events and identifying frequency anomalies by interpreting the extracted seismic attribute data for the various zones of the seismic events; (d) identifying and removing (i.e., filtering) any potential false positive frequency anomalies; and (e) confirming any remaining anomalies not removed during the removing step and ranking the remaining, confirmed anomalies.

The step (a) of 'data loading and quality control' (step 10 of FIG. 5) may comprise the loading of SEG-Y formatted seismic data into the interpretation software program and visually reviewing the data. The step of 'variance section generation and fault identification' may comprise of the calculation of the variance attribute for the entire line and reviewing it visually for areas of high variance that may indicate faulting and associated possible fracturing.

The step (b) of 'identifying the seismic events that correspond to the formation of interest' (step 20 of FIG. 5) may comprise the extraction of a seismic wavelet and the performance of a well to seismic tie through the generation of the synthetic.

The step (c) of 'extracting seismic attribute data from various zones of the seismic events' and 'identifying frequency anomalies by interpreting the extracted seismic attribute data for the various zones of the seismic events' (step 30 of FIG. 5) may comprise the steps of: (1) 'extracting a Dominant Frequency attribute', and (2) 'posting attribute values on a ribbon posting map and examining the posted attribute values for rapid shifts in frequencies from higher to lower frequencies'. The step of 'extracting seismic attribute data from various zones of the seismic events' comprises the step of 'extracting a Dominant Frequency attribute'. The step of 'identifying frequency anomalies by interpreting the extracted seismic attribute data for the various zones of the seismic events' comprises the step of 'posting attribute values on a ribbon posting map and examining the posted attribute values for rapid shifts in frequencies from higher to lower frequencies'.

The step (d) of 'identifying and removing (i.e., filtering) potential false positive frequency anomalies' (step 40 of FIG. 5) may comprise the extraction and examination of Dominant Frequency for a near surface seismic event and comparison with those of the zone(s) of interest.

The step (e) of 'confirming any remaining anomalies not removed during the removing step and the ranking of the confirmed, remaining anomalies' (step 50 of FIG. 5) may comprise the extraction and examination of the seismic frequency spectrums from selected zones above, below and including the formation(s) of interest.

Reservoirs are created or enhanced by the presence of natural, open fracture systems. These open fracture systems can occur in any rock type, at any depth, and trend in any direction. Due to the high angle, near vertical nature of many of these systems, few open fractures can be intersected with vertical boreholes drilled with traditional methods. The greatest volume of these reservoirs is accessed by highly deviated to horizontal boreholes that are drilled perpendicular to the trend of the fracture system. Being able to seismically detect open, near vertical, natural fractures, and to determine their depth and trend allows for the planning of exploration or development wells that drain the greatest amount of reservoir volume.

It has been shown mathematically that the presence of open fractures can result in the attenuation of higher seismic frequencies. Fractures have also been found to often be associated with faulting and folding. The 'Fracture Trend Identification software' of the present invention is a workflow (or process) that utilizes multiple seismic attributes, extracted from stacked 2D, compressional P-wave seismic data and analyzed in a specific sequence. This sequence starts by using variance sections, generated using the Computation Manager module within GeoFrame's IESX software, to identify areas of faulting and folding. The Computation Manager is also used to extract the 'dominant frequency' for zones directly above and below the zone of interest, and a number of zones containing the zone interest and a shallow seismic event. These frequencies are then posted on a ribbon posting map using GeoFrame's IESX Basemap module and examined to identify locations where rapid decreases in frequency content occur. The 'dominant frequencies' from immediately above the zone of interest are used to confirm that the frequency'shifts observed in the zone of interest are indeed the result of changes within the zone of interest and not the result of frequency attenuation that occurred above it. The 'dominant frequencies' of the shallow event are also used to identify shifts in frequencies that may be source related and thereby give a false positive. Wavelet extraction software is then used to determine the frequency power spectrum for 150 milliseconds windows above and below the top of the zone of interest in selected locations along the seismic lines. These are examined for shifts in the power spectrum that can confirm the frequency shifts observed in the dominant frequencies for the zone of interest. The zones of rapidly decreased frequency within the formation of interest that are not related of the source or shallower influences are then believed to be zones of nature, near vertical, open fractures. These are compared to the variance sections to determine what geological features (faulting and or folding) to which they may be related. The 'Computation Manager', 'GeoFrame', 'IESX', and 'Basemap' software packages referenced hereinabove are available from Schlumberger Technology Corporation of Houston, Tex.

Fractured reservoirs are rapidly becoming important targets of exploration throughout the world. The 'Fracture Trend Identification software' of the present invention would be of importance in any exploration play or field development plan that targets fractured reservoirs or seeks to locate "sweet spots" in existing standard, matrix porosity reservoirs. Open fracture systems may also result in complications for secondary and tertiary recovery procedures of hydrocarbons in existing fields. Identifying these systems would have a major impact on the simulation, planning and implementation of these procedures.

Referring to FIG. 1, an Earth formation 60 includes a layer of fractured rock 62 which is disposed between a first horizon 68 and a second horizon 70 in the formation 60. A seismic energy source 64 generates an acoustic sound wave 66 which reflects off the horizons 68 and 70, the reflected acoustic wave 72 being received in a geophone 74 located at the Earth's surface. The geophone 74 generates output signals representative of the reflected acoustic wave 72, those output signals being received in a recording truck 76. The recording truck 76 will generate a set of 'compressional 2D seismic data' 78 which is representative of the reflected acoustic wave 72 received in the geophone 74.

Figure 2:
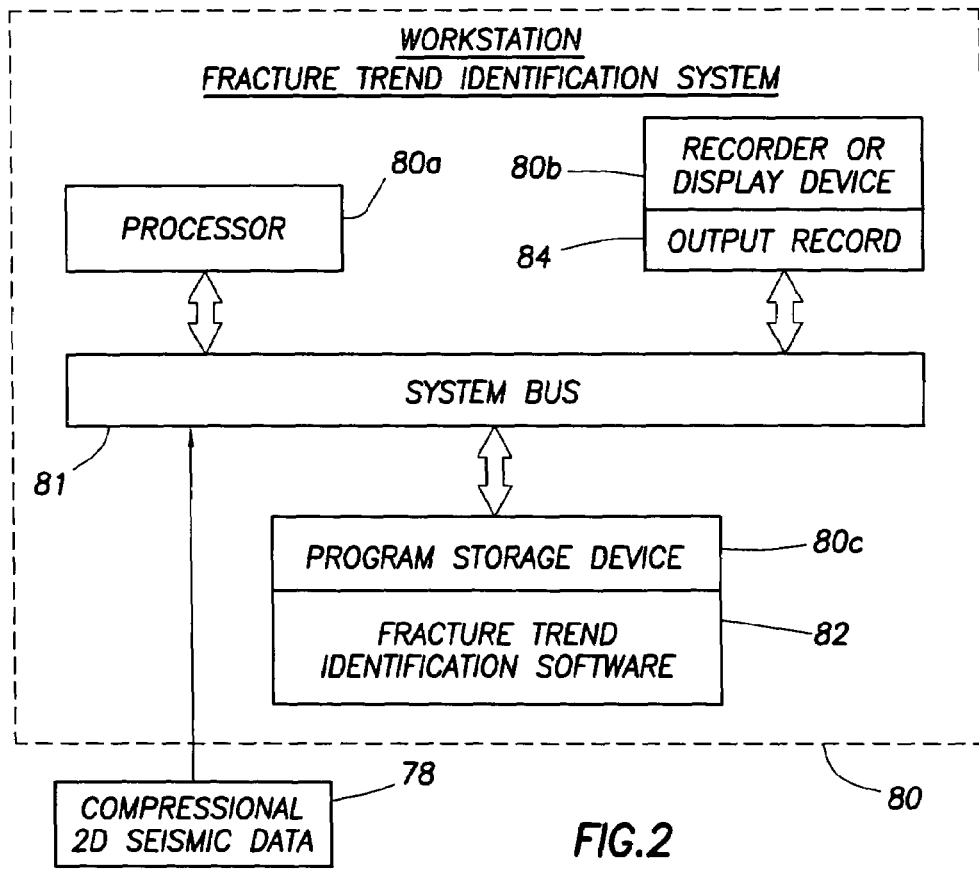
FIG. 2 illustrates a workstation or other computer system responsive to the aforementioned compressional 2D seismic data adapted for executing a Fracture Trend Identification Software stored in a memory or program storage device of the workstation and generating an Output Record in response thereto.
Figure 3:
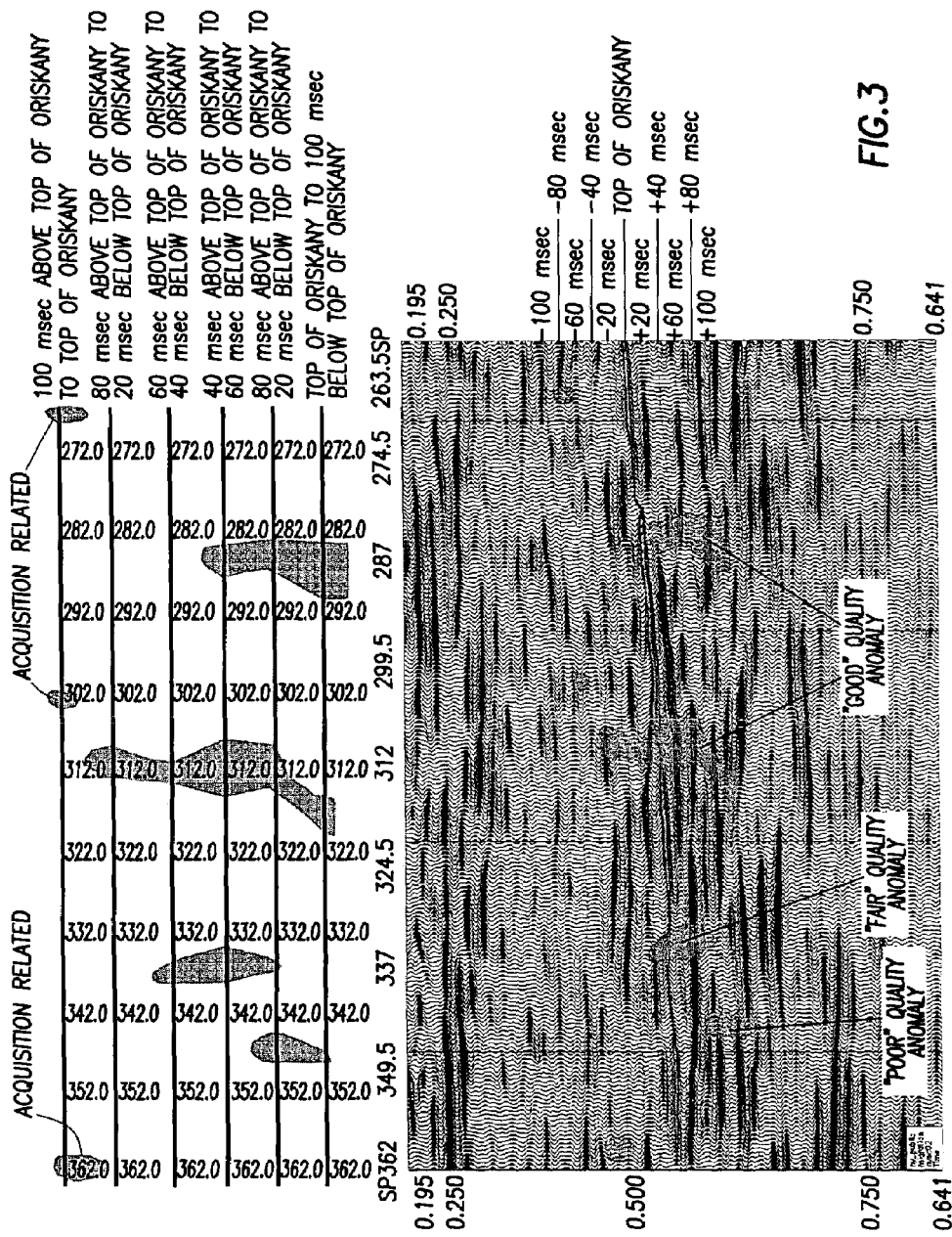
FIGS. 3 and 4 illustrate examples of the Output Record generated by the workstation or other computer system of FIG. 2.
Figure 4:
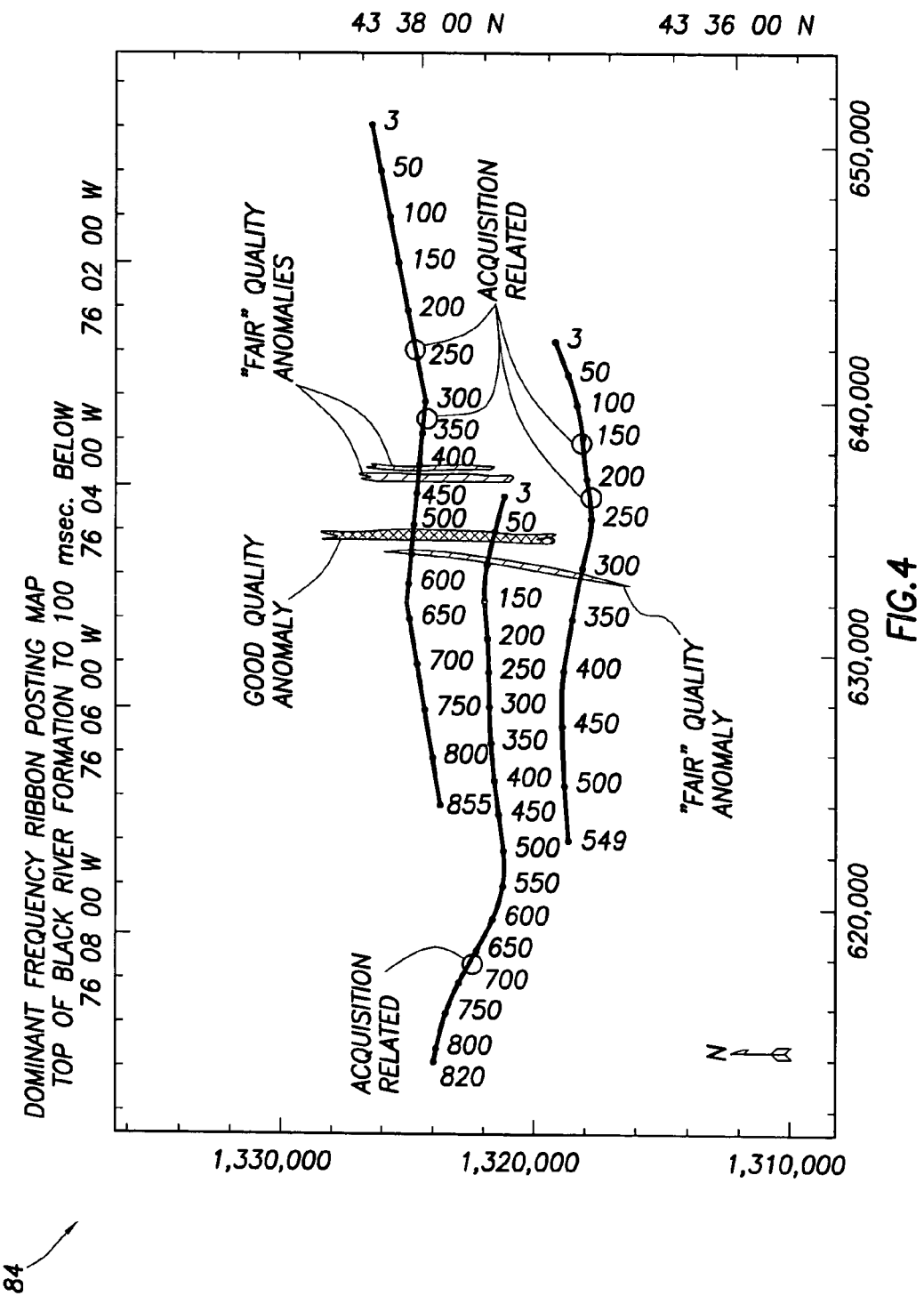

Referring to FIG. 2, a workstation or other computer system 80 is actually a 'Fracture Trend Identification system' because the workstation 80 stores a novel software in accordance with the present invention known as a 'Fracture Trend Identification software'. The workstation 80 includes a processor 80a operatively connected to a system bus 81, a recorder or display device 80b operatively connected to the system bus 81, and a memory/program storage device 80c operatively connected to the system bus 81. The memory/program storage device 80c will store the 'Fracture Trend Identification software' 82 therein in accordance with the present invention. The 'Fracture Trend Identification software' 82 was originally stored on a CD-Rom or other such program storage device, the 'Fracture Trend Identification software' 82 being loaded from the CD-Rom into the workstation 80 for storage in the memory/program storage device 80c of the workstation 80. The processor 80a is adapted to execute the 'Fracture Trend Identification software' 82 and, when that execution is complete, the recorder or display device 80b will generate an Output Record 84. An example of that Output Record 84 is shown in FIGS. 3 and 4 of the drawings. The workstation 80 may be a personal computer (PC), or a workstation. Examples of possible workstations include a Silicon Graphics Indigo 2 workstation or a Sun SPARC workstation or a Sun ULTRA workstation or a Sun BLADE workstation. The memory/program storage device 80c is a computer readable medium or a program storage device which is readable by a machine, such as the processor 80a. The processor 80a may be, for example, a microprocessor, microcontroller, or workstation processor. The memory/program storage device 80c, which stores the 'Fracture Trend Identification software' 82, may be, for example, a hard disk, ROM, CD-ROM, DRAM, or other RAM, flash memory, magnetic storage, optical storage, registers, or other volatile and/or non-volatile memory.

Referring to FIGS. 3 and 4, an example of the Output Record 84 which is generated by the recorder or display device 80b of the workstation 80 is illustrated. FIG. 3 is an Output Record 84 for a single 2D seismic line, and FIG. 4 is an Output Record 84 representing a ribbon posting map used for a number of 2D seismic lines.

Referring to FIGS. 5 through 10, a detailed construction of the 'Fracture Trend Identification software' 82 of the present invention stored in the workstation 80 of FIG. 2 is illustrated.

Figure 5:
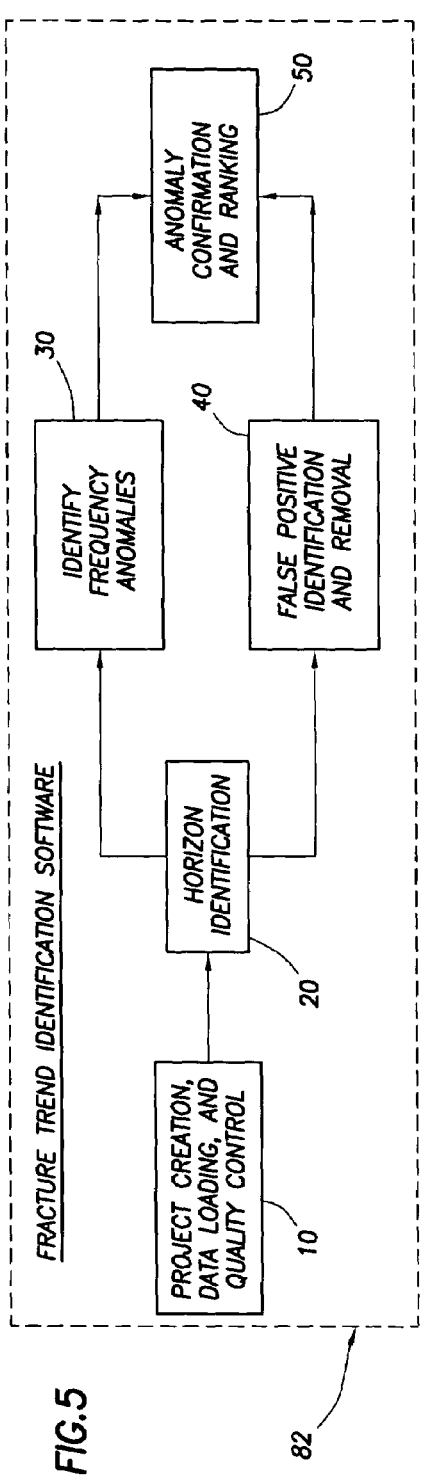
FIG. 5 illustrates a workflow diagram of the Fracture Trend Identification software stored in the memory of the workstation of FIG. 2.

In FIG. 5, the 'Fracture Trend Identification software' 82 includes a 'Project Creation, Data Loading, and Quality Control' step 10, a 'Horizon Identification' step 20 which is responsive to the output of step 10, an 'Identify Frequency Anomalies' step 30 which is responsive to the output of step 20, a 'False Positive Identification and Removal' step 40 which is responsive to the output of step 20, and an 'Anomaly Confirmation and Ranking' step 50 which is responsive to the output of steps 30 and 40. Each of these steps will be discussed in detail in later sections in this specification.

Figure 6:
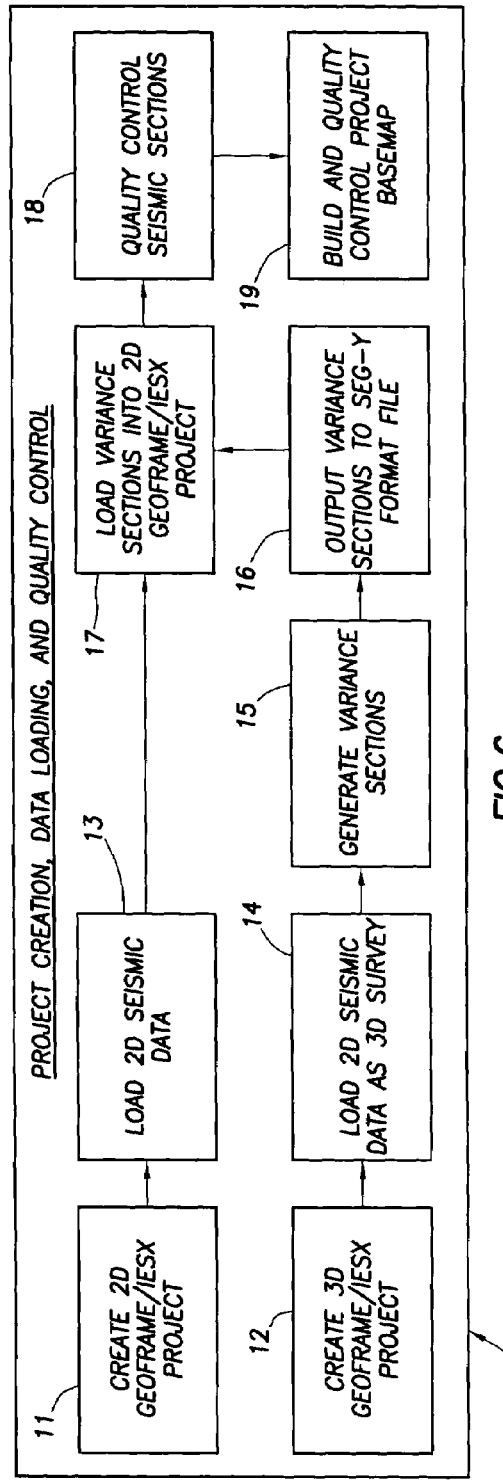
FIG. 6 illustrates a workflow diagram of the Project Creation, Data Loading and Quality Control block associated with the Fracture Trend Identification software illustrated in FIG. 5.

In FIG. 6, a detailed construction of the 'Project Creation, Data Loading, and Quality Control' step 10 of FIG. 5 is illustrated. The 'Project Creation, Data Loading, and Quality Control' step 10 of FIG. 5 includes a 'create 3D Geoframe/IESX project' step 12, a 'load 2D seismic data as 3D survey' step 14 which is responsive to the output of step 12, a 'generate variance sections' step 15 which is responsive to the output of step 14, an 'output variance sections to SEG-Y format file' step 16 which is responsive to the output of step 15, a 'create 2D Geoframe/IESX project' step 11, a 'load 2D seismic data' step 13 which is responsive to the output of step 11, a 'load variance sections into 2D Geoframe/IESX project' step 17 which is responsive to the output from steps 13 and 16, a 'quality control seismic sections' step 18 which is responsive to the output of step 17, and a 'build and quality control project basemap' step 19 which is responsive to the output from step 18. Each of these steps will be discussed in greater detail later in this specification.

Figure 7:
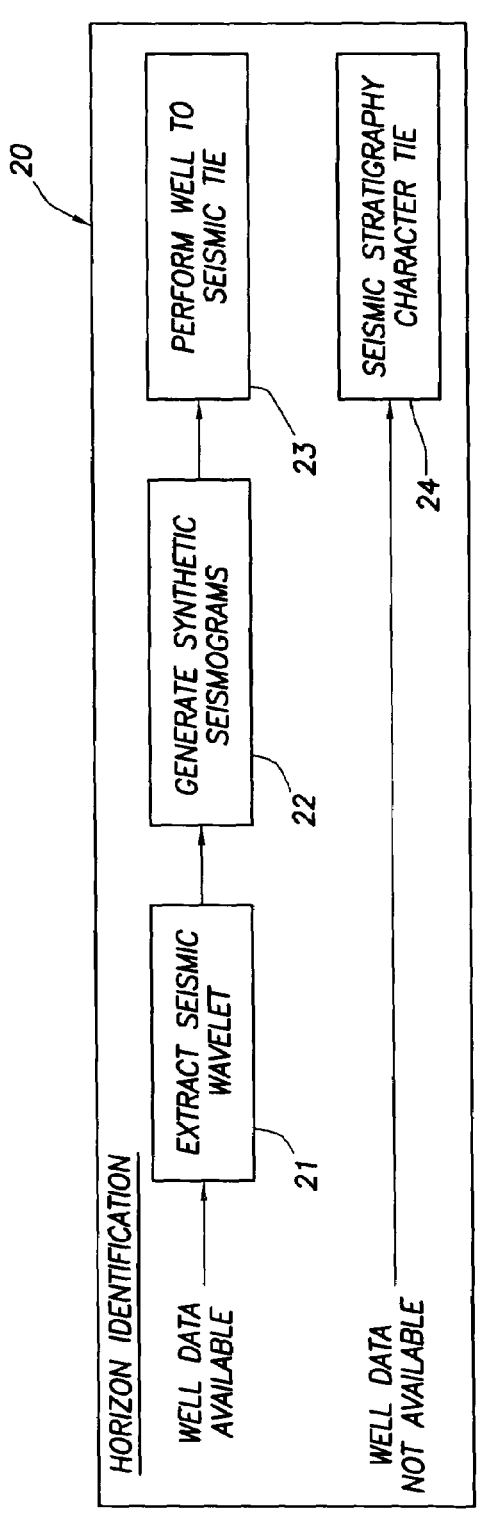
FIG. 7 illustrates a workflow diagram of the Horizon Identification block associated with the Fracture Trend Identification software illustrated in FIG. 5.

In FIG. 7, a detailed construction of the 'Horizon Identification' step 20 of FIG. 5 is illustrated. The 'horizon identification' step 20 of FIG. 5 includes an 'extract seismic wavelet' step 21 which is responsive to well data when well data is available, a 'generate synthetic seismograms' step 22 which is responsive to the output from step 21, a 'perform well to seismic tie' step 23 which is responsive to the output from step 22, and a 'seismic stratigraphy character tie' step 24 which is practiced when the well data is not available. Each of these steps will be discussed in greater detail later in this specification.

Figure 8:
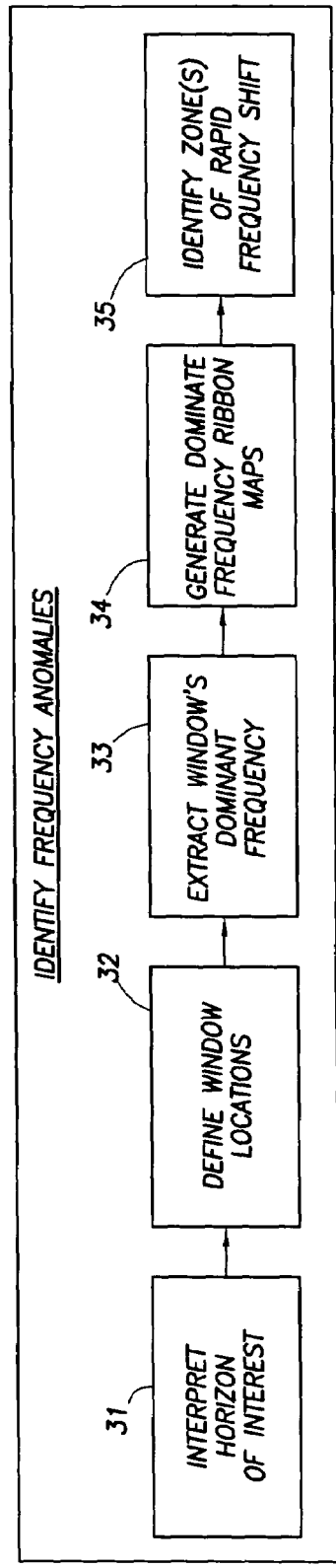
FIG. 8 illustrates a workflow diagram of the Identify Frequency Anomalies block associated with the Fracture Trend Identification software illustrated in FIG. 5.

In FIG. 8, a detailed construction of the 'Identify Frequency Anomalies' step 30 of FIG. 5 is illustrated. The 'Identify Frequency Anomalies' step 30 of FIG. 5 includes an 'interpret horizon of interest' step 31, a 'define window locations' step 32 which is responsive to the output from step 31, an "extract windows' dominant frequency" step 33 which is responsive to the output from step 32, a 'generate dominant frequencies ribbon maps' step 34 which is responsive to the output from step 33, and an 'identify zones of rapid frequency shifts' step 35 which is responsive to the output from step 34. Each of these steps will be discussed in greater detail later in this specification.

Figure 9:
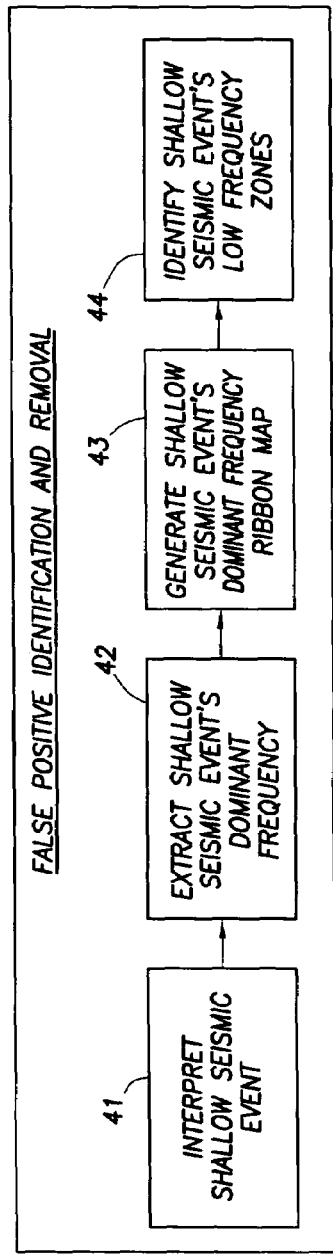
FIG. 9 illustrates a workflow diagram of the False Positive Identification and Removal block associated with the Fracture Trend Identification software illustrated in FIG. 5.

In FIG. 9, a detailed construction of the 'False Positive Identification and Removal' step 40 of FIG. 5 is illustrated. The 'False Positive Identification and Removal' step 40 of FIG. 5 includes an 'interpret shallow seismic event' step 41, an "extract shallow seismic event's Dominant Frequency" step 42 which is responsive to the output from step 41, a "Generate shallow seismic event's Dominant Frequency ribbon map" step 43 which is responsive to the output from step 42, and an "identify shallow seismic event's low frequency zones" step 44 which is responsive to the output from step 43. Each of these steps will be discussed in greater detail later in this specification.

Figure 10:
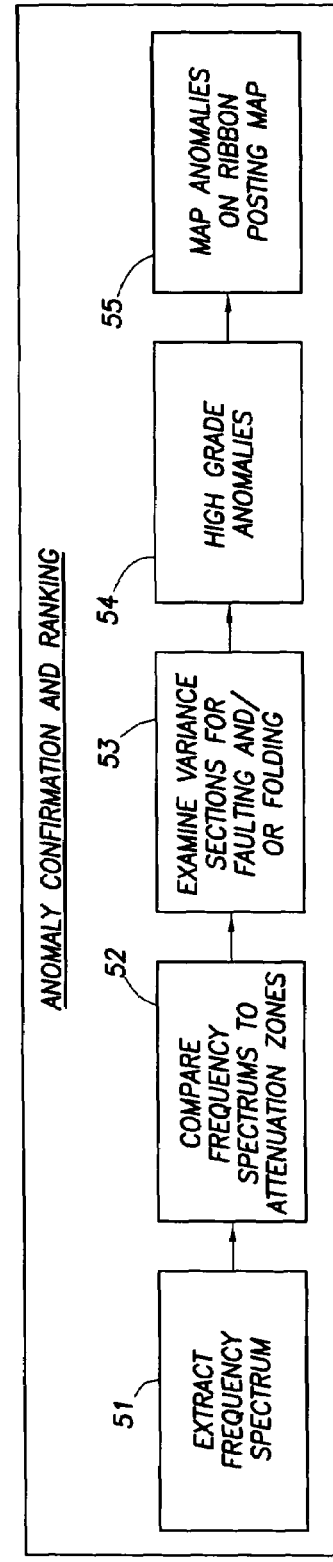
FIG. 10 illustrates a workflow diagram of the Anomaly Confirmation and Ranking block associated with the Fracture Trend Identification software illustrated in FIG. 5.

In FIG. 10, a detailed construction of the 'Anomaly Confirmation and Ranking' step 50 of FIG. 5 is illustrated. The 'Anomaly Confirmation and Ranking' step 50 of FIG. 5 includes an 'extract frequency spectrum' step 51, a 'compare frequency spectrums to attenuation zones' step 52 which is responsive to the output from step 51, an 'examine variance sections for faulting and/or folding' step 53 which is responsive to the output from step 52, a 'high grade anomalies' step 54 which is responsive to the output from step 53, and a 'map anomalies on ribbon posting map' step 55 which is responsive to the output from step 54. Each of these steps will be discussed in greater detail later in this specification.

Referring to FIGS. 11 through 22, the following discussion with reference to FIGS. 11 through 22 will provide a good understanding of the method practiced by the 'Fracture Trend Identification software' 82 of the present invention when that software 82 is executed by the processor 80a of the workstation 80 of FIG. 2.

In FIGS. 11–22, note that a processing window one hundred milliseconds in length (element numerals 90, 94, 98, 102, 106, 110, 114, 118, 122, 126, and 130, respectively, in FIGS. 11–22) will move downwardly by 20 millisecond shifts starting with a position located 100 milliseconds above the formation top 70 to a position located 100 milliseconds below the formation top 70, and, during the movement of that window and in each position of that window, the amount of low frequencies will be observed, the observed low frequencies being posted for each position of the window on a ribbon posting map (element numerals 92, 96, 100, 104, 108, 112, 116, 120, 124, 128, and 132, respectively, in FIGS. 11–22).

Figure 11:
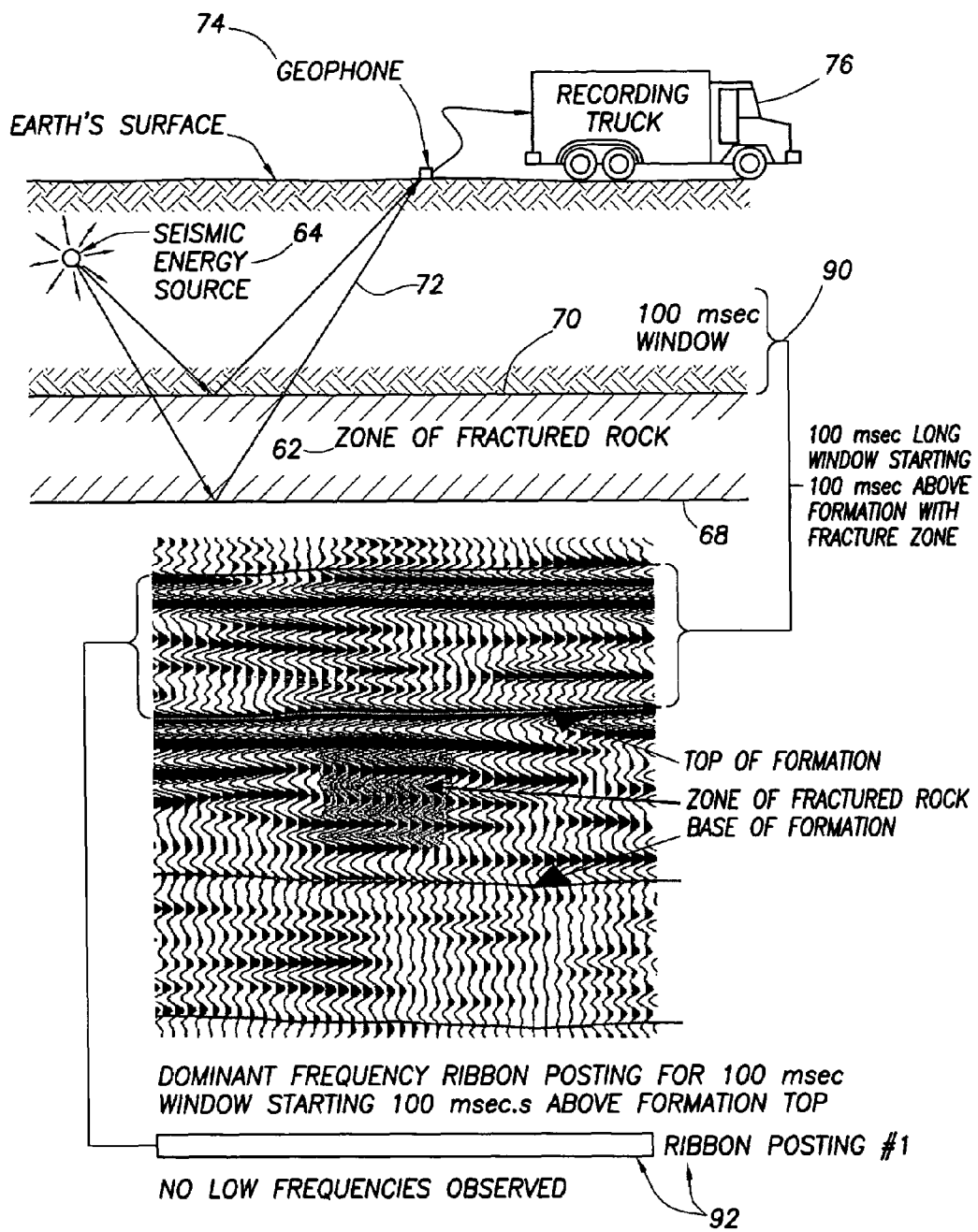
FIGS. 11 through 21 illustrate a plurality of dominant frequency ribbon postings for a 100 millisecond window beginning at 100 msecs above the formation top and moving downwardly to 100 msecs below the top of the formation, some low frequencies being observed during the movement of the window.

In FIG. 11, a 100 msec window 90 starts 100 msec above the formation top 70 containing the zone of fractured rock 62; and a dominant frequency ribbon posting 92 is illustrated associated with the 100 msec window 90 which starts at 100 msec above the top 70 of the formation. No low frequencies are observed.

Figure 12:
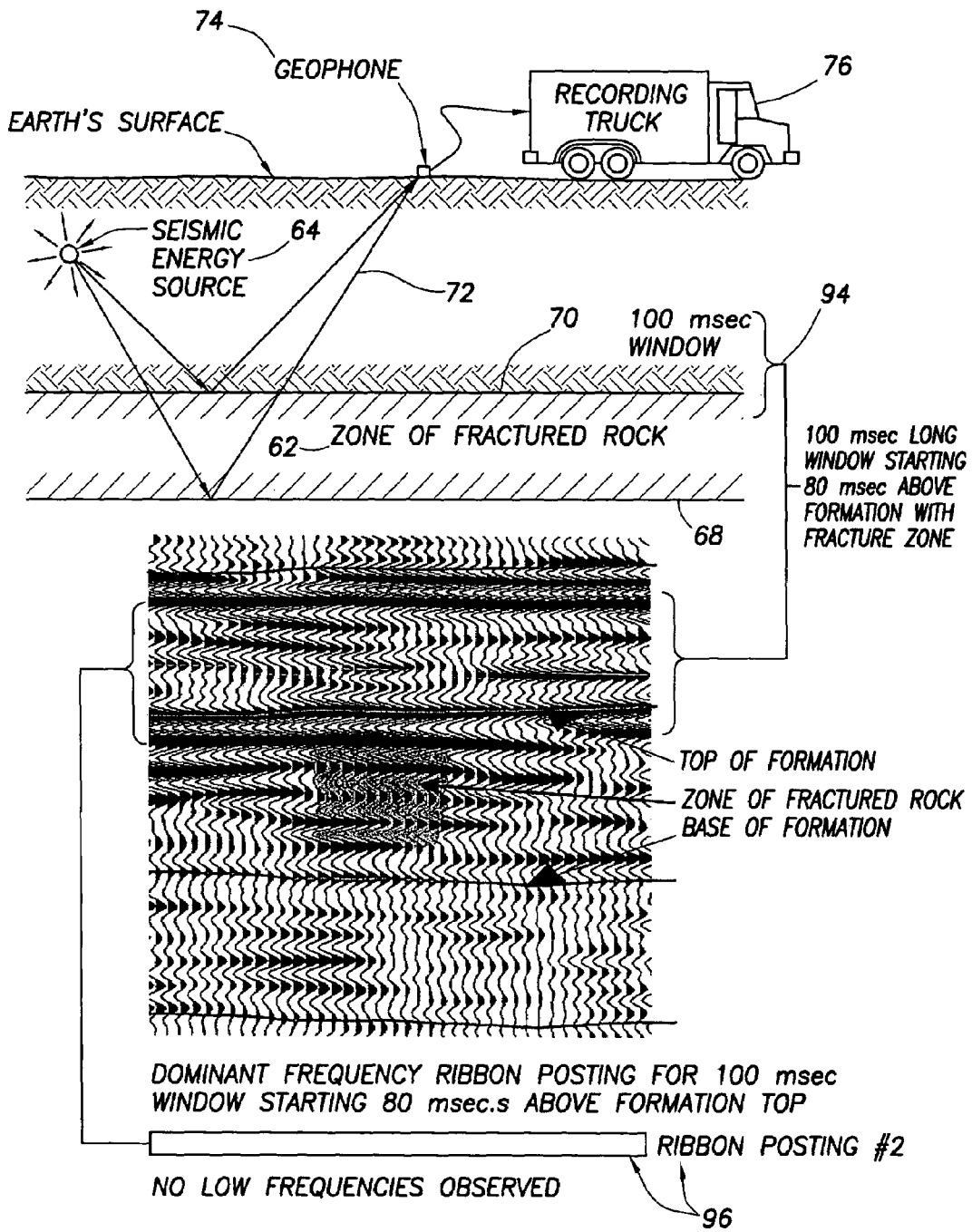

In FIG. 12, a 100 msec window 94 starts 80 msec above the top 70 of the formation having the zone of fractured rock 62; and a dominant frequency ribbon posting 96 is illustrated associated with the 100 msec window 94 which starts at 80 msec above the top 70 of the formation. No low dominant frequencies are observed.

Figure 13:
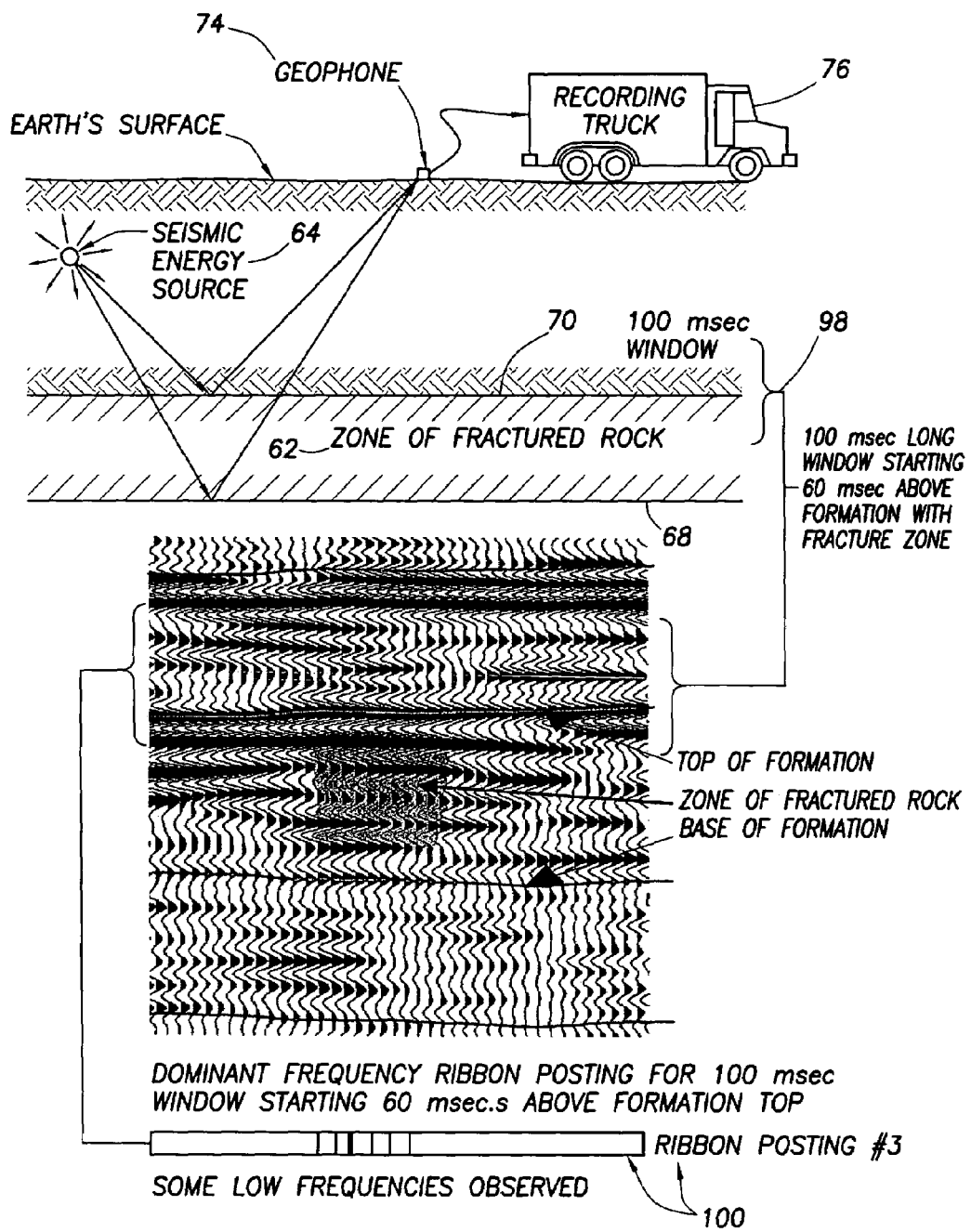

In FIG. 13, a 100 msec window 98 starts 60 msec above the top 70 of the formation containing the zone of fractured rock 62; and a dominant frequency ribbon posting 100 is illustrated associated with the 100 msec window 98 which starts at 60 msec above the top 70 of the formation. Some low dominant frequencies are observed.

Figure 14:
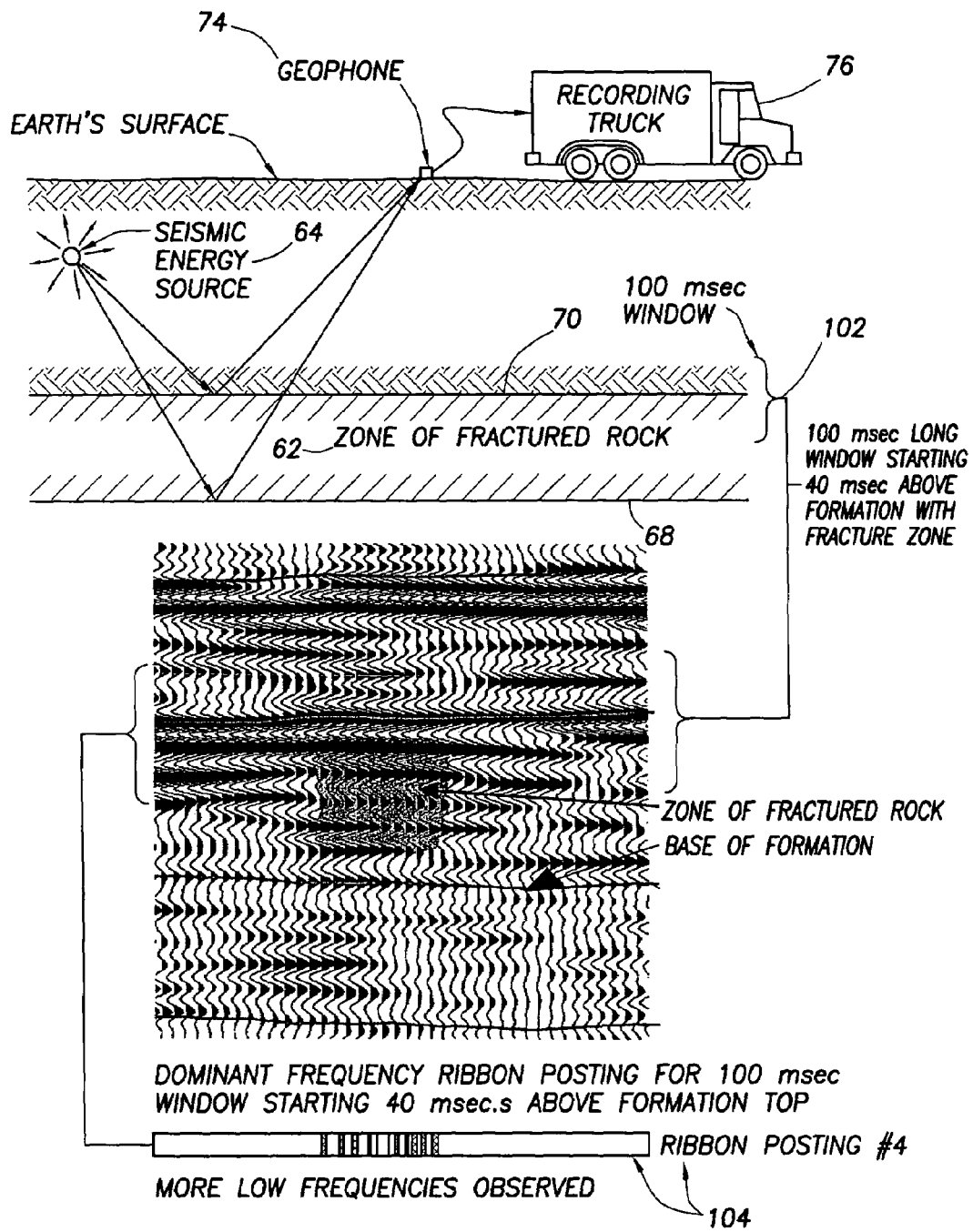

In FIG. 14, a 100 msec window 102 starts 40 msec above the top 70 of the formation having the zone of fractured rock 62; and a dominant frequency ribbon posting 104 is illustrated associated with the 100 msec window 102 which starts at 40 msec above the top 70 of the formation. More low dominant frequencies are observed.

Figure 15:
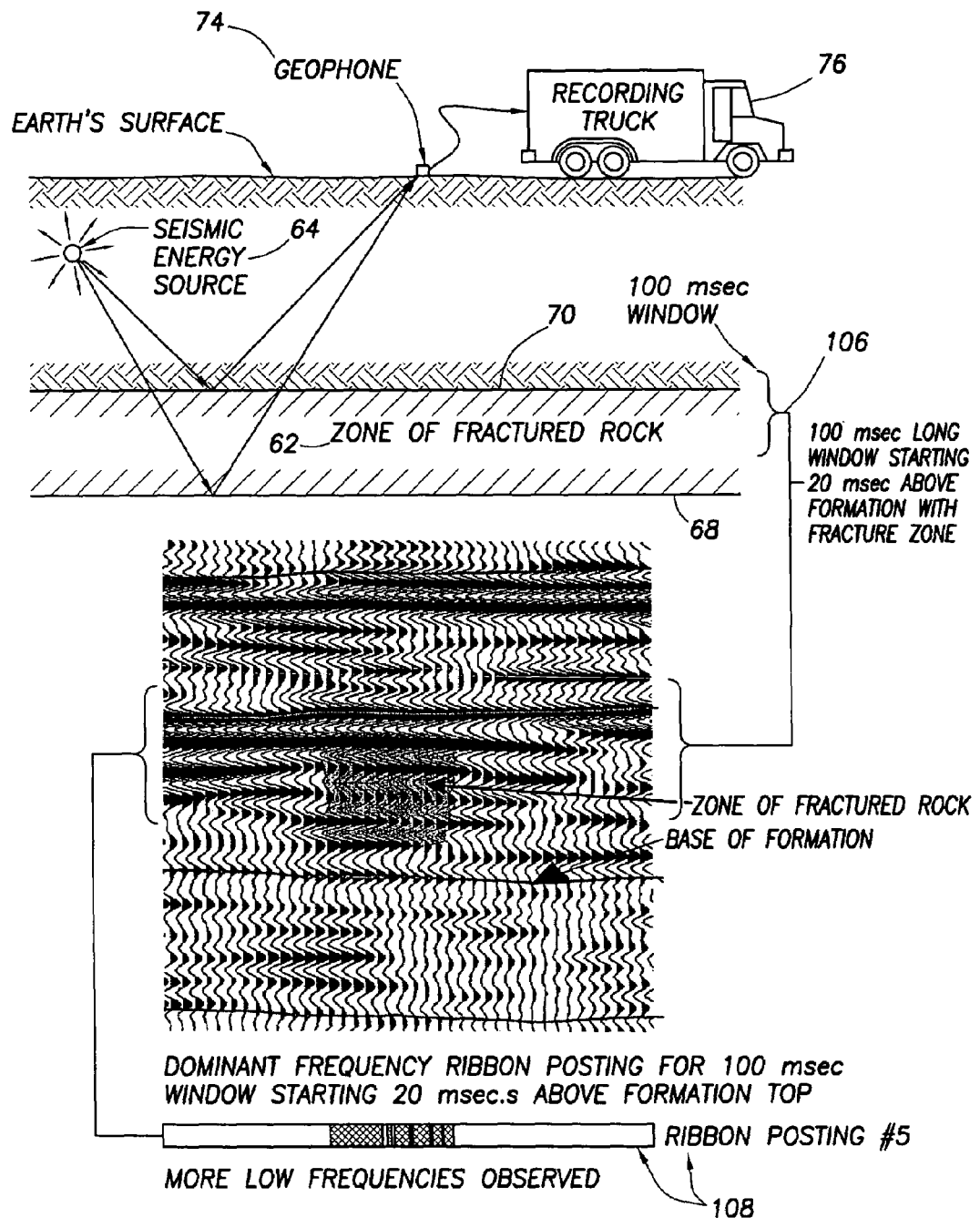

In FIG. 15, a 100 msec window 106 starts 20 msec above the top 70 of the formation having the zone of fractured rock 62; and a dominant frequency ribbon posting 108 is illustrated associated with the 100 msec window 106 which starts at 20 msec above the top 70 of the formation. More low dominant frequencies are observed.

Figure 16:
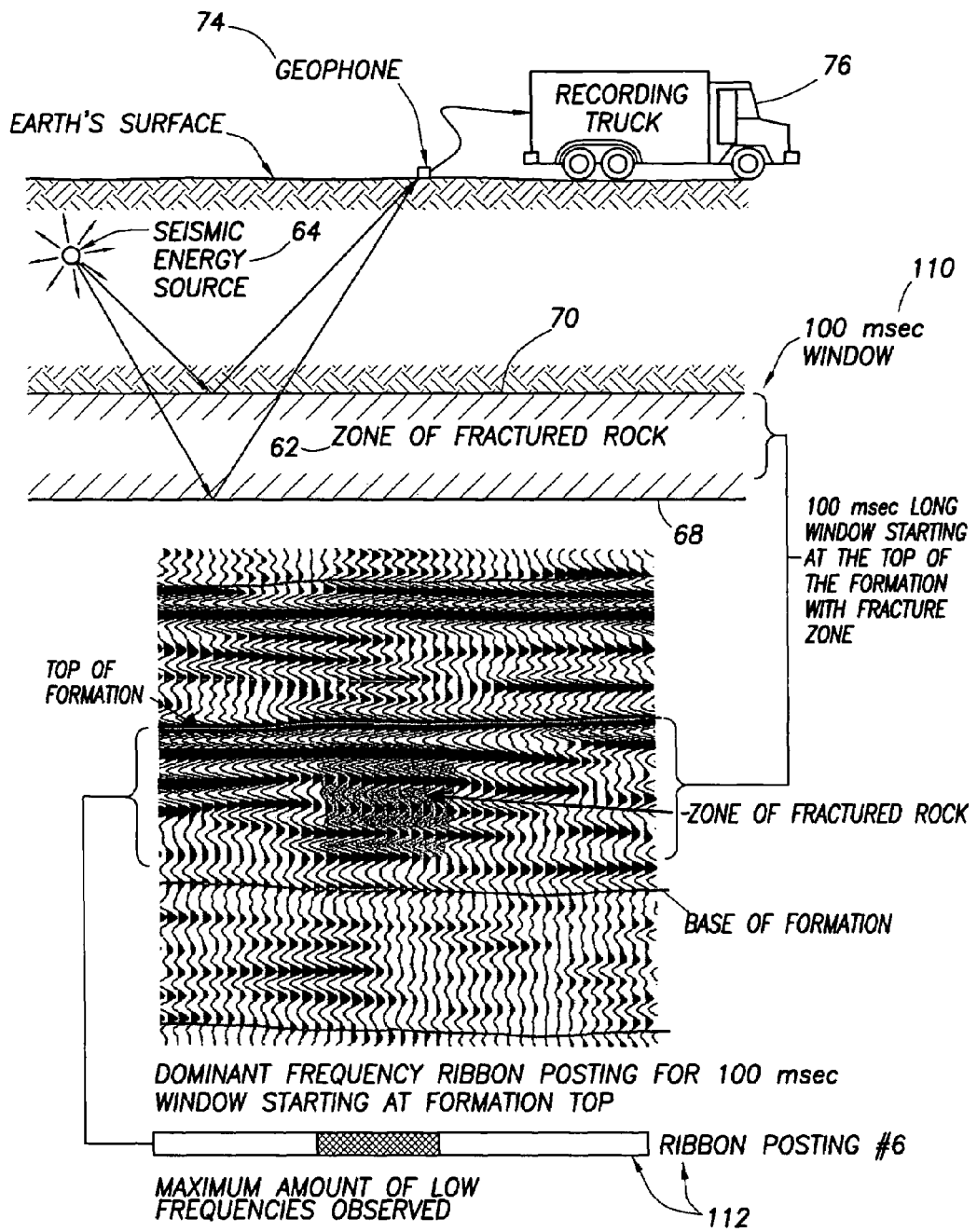

In FIG. 16, a 100 msec window 110 starts at the top 70 of the formation having the zone of fractured rock 62; and a dominant frequency ribbon posting 112 is illustrated associated with the 100 msec window 110 which starts at the top 70 of the formation. A maximum amount of low dominant frequencies is observed.

Figure 17:
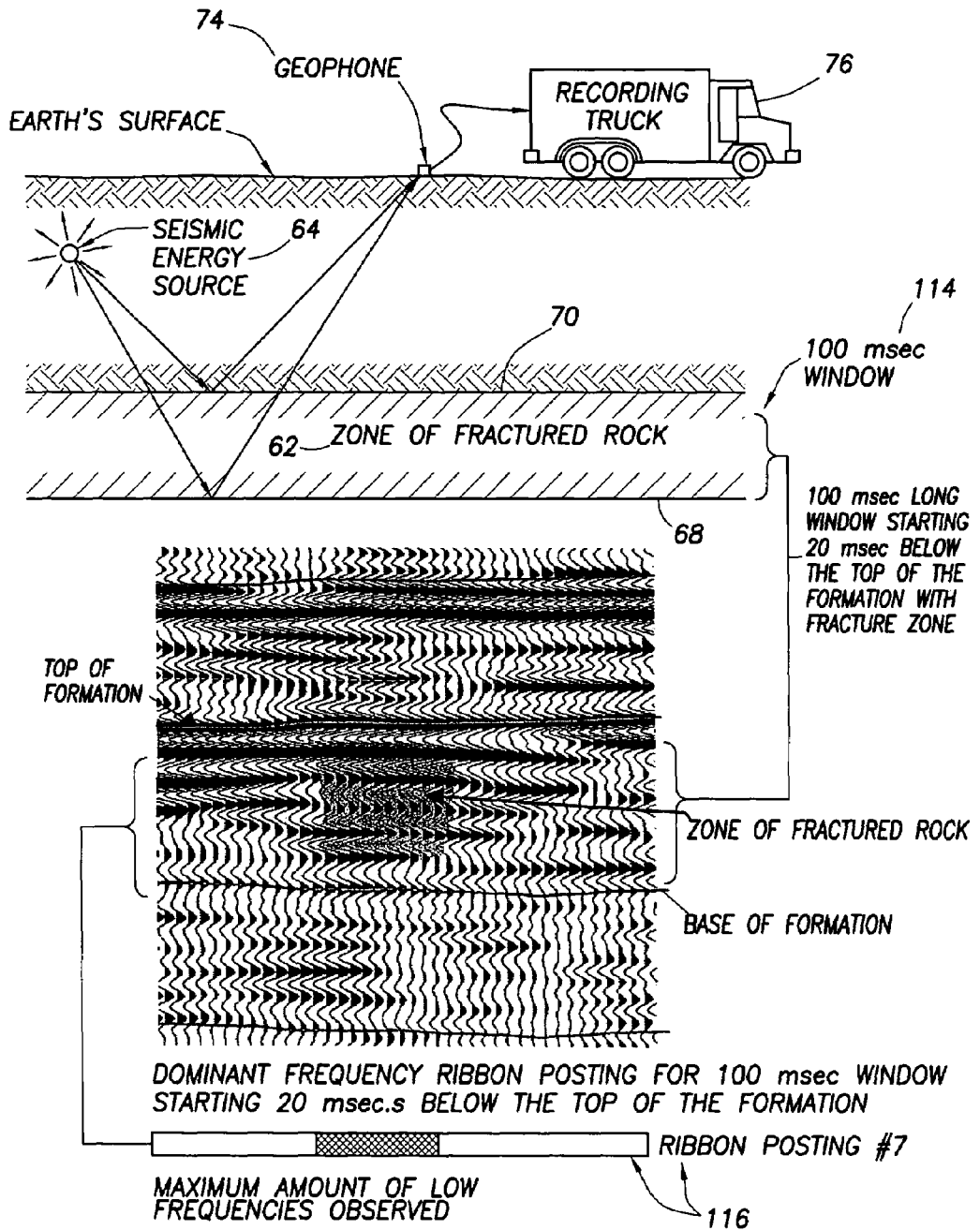

In FIG. 17, a 100 msec window 114 starts 20 msec below the top 70 of the formation having the zone of fractured rock 62; and a dominant frequency ribbon posting 116 is illustrated associated with the 100 msec window 114 which starts at 20 msec below the top 70 of the formation. A maximum amount of low dominant frequencies is observed.

Figure 18:
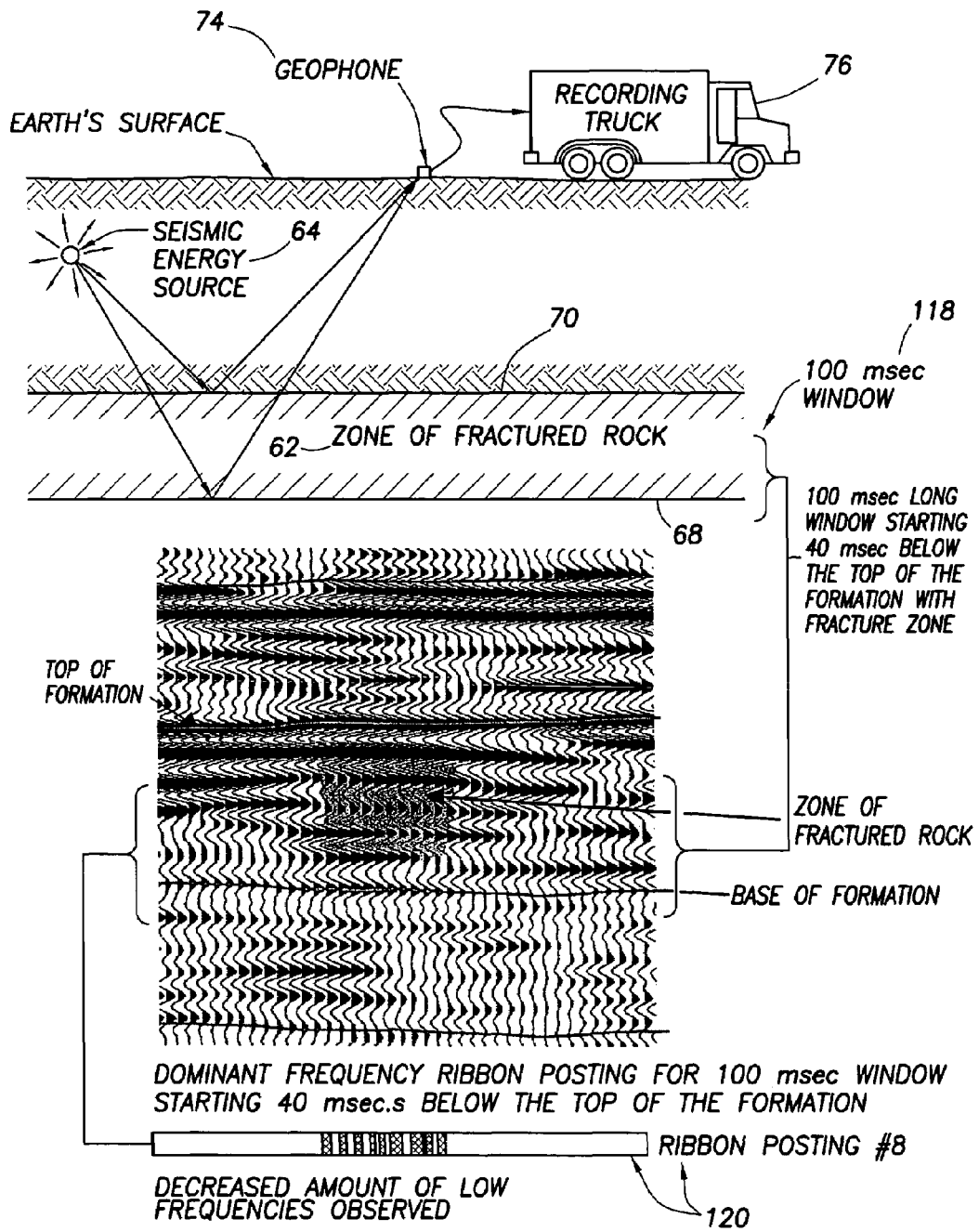

In FIG. 18, a 100 msec window 118 starts 40 msec below the top 70 of the formation having the zone of fractured rock 62; and a dominant frequency ribbon posting 120 is illustrated associated with the 100 msec window 118 which starts at 40 msec below the top 70 of the formation. A decrease in the amount of low dominant frequencies is observed.

Figure 19:
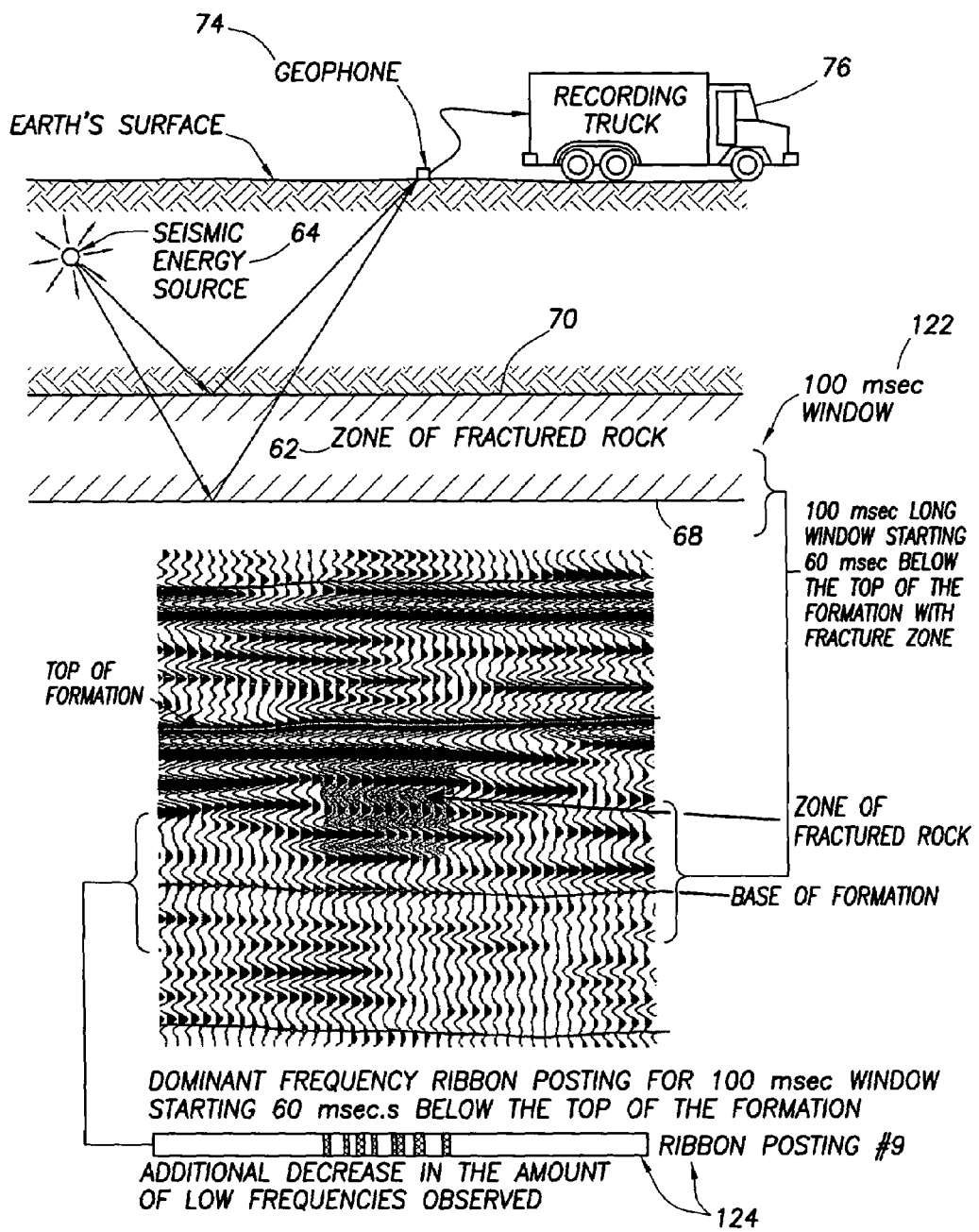

In FIG. 19, a 100 msec window 122 starts 60 msec below the top 70 of the formation having the zone of fractured rock 62; and a dominant frequency ribbon posting 124 is illustrated associated with the 100 msec window 122 which starts at 60 msec below the top 70 of the formation. An additional decrease in the amount of low dominant frequencies is observed.

Figure 20:
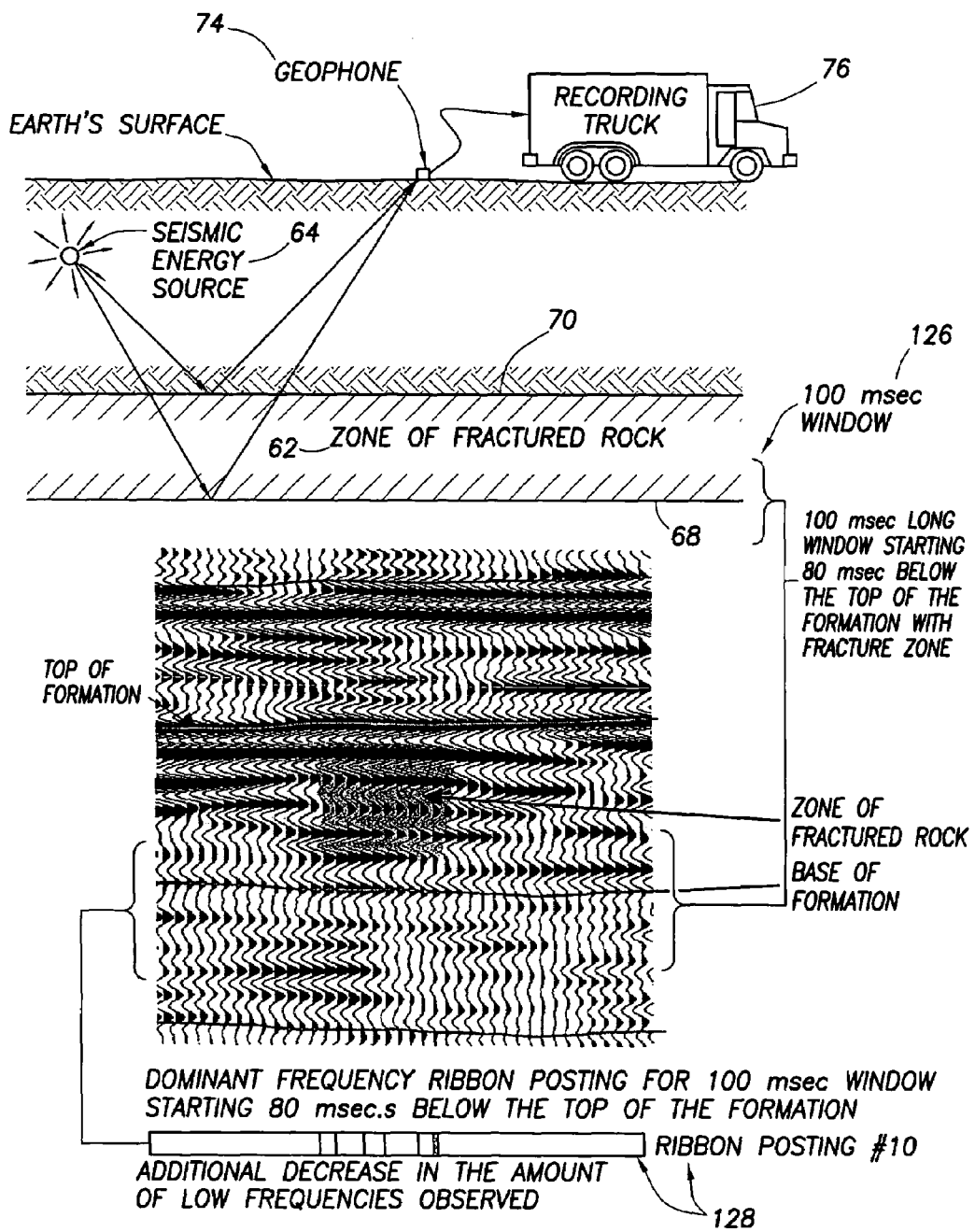

In FIG. 20, a 100 msec window 126 starts 80 msec below the top 70 of the formation having the zone of fractured rock 62; and a dominant frequency ribbon posting 128 is illustrated associated with the 100 msec window 126 which starts at 80 msec below the top 70 of the formation. An additional decrease in the amount of low dominant frequencies is observed.

Figure 21:
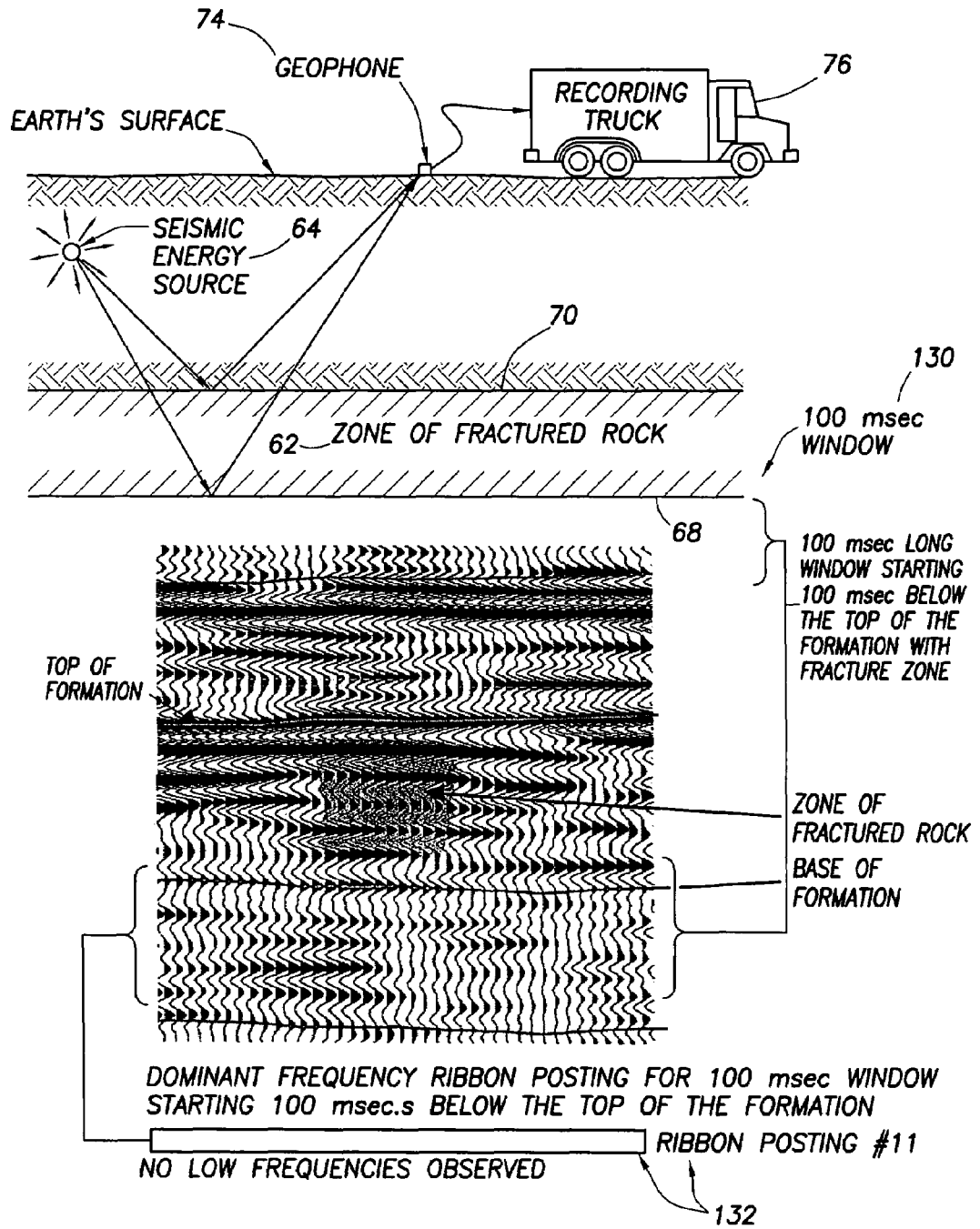

In FIG. 21, a 100 msec window 130 starts 100 msec below the top 70 of the formation having the zone of fractured rock 62; and a dominant frequency ribbon posting 132 is illustrated associated with the 100 msec window 130 which starts at 100 msec below the top 70 of the formation. No low dominant frequencies are observed.

Figure 22:
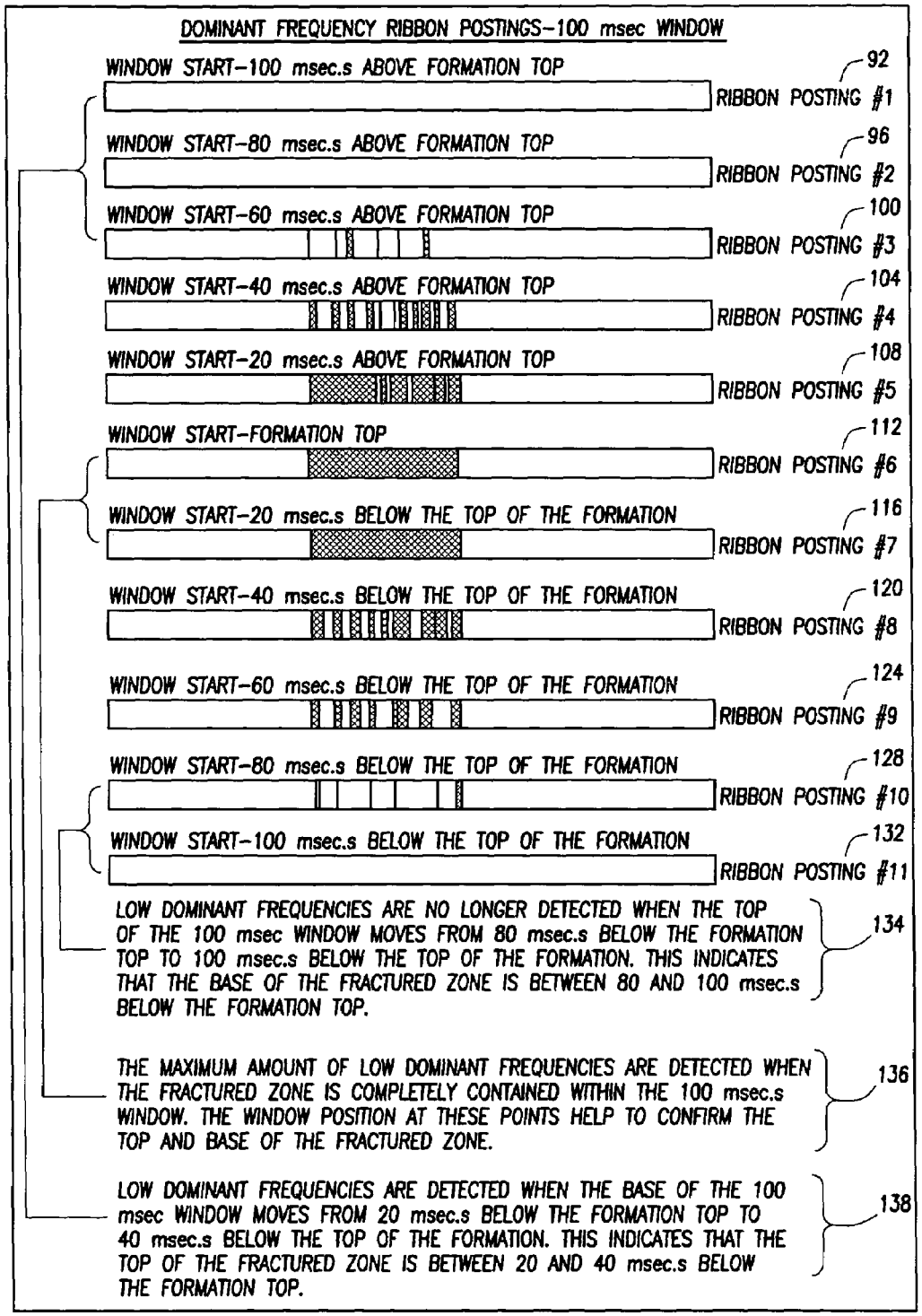
FIG. 22 is a 'results oriented' figure illustrating the results obtained from FIGS. 11 through 21, FIG. 22 depicting a plurality of dominant frequency of low frequencies in each such posting.

In FIG. 22, the ribbon postings 92, 96, 100, 104, 108, 112, 116, 120, 124, 128, and 132 from FIGS. 11 through 21 are illustrated again in FIG. 22.

In FIG. 22, in connection with ribbon postings 96 and 100, refer to element numeral 138 wherein low dominant frequencies are detected when the 'base' of the 100 msec window moves from 20 msec below the formation top 70 to 40 msec below the top 70 of the formation. This indicates that the top of the fractured zone 62 is between 20 and 40 msec below the formation top.

In FIG. 22, in connection with ribbon postings 112 and 116, refer to element numeral 136 wherein the maximum amount of low dominant frequencies are detected when the fractured zone 62 is completely contained within the 100 msec window. The window position at these points help to confirm the top and base of the fractured zone 62.

In FIG. 22, in connection with ribbon postings 128 and 132, refer to element numeral 134 wherein low dominant frequencies are no longer detected when the 'top of the 100 msec window' moves from 80 msec below the formation top 70 to 100 msecs below the top 70 of the formation. This indicates that the 'base of the fractured zone' is between 80 and 100 msec below the formation top 70.

The 'Fracture Trend Identification method' associated with the 'Fracture Trend Identification software' 82 of the present invention: (1) uses a 100 millisecond (msec) window, which allows for a better determination of where the fractures occur vertically; (2) uses a number of windows that vertically overlap in places as the 100 msec window is shifted down; this allows for an even finer vertical determination of where the fractures occur which is equal to the amount of the shift used; which in the example shown in FIGS. 11 through 22 is 20 msec; (3) extracts the 'Dominant Frequency' for the intervals and then posts the Dominant Frequencies on a map and compares the Dominant Frequencies; no additional calculation is needed; (4) is a 'fast' method because the Fracture Trend Identification software handles all tasks; this allows for a large number of seismic lines to be compared quickly; (5) specifically tests for potential false positives that may result from the acquisition of the seismic; and (6) ranks the anomalies by comparing the amount of absorption; as a result, the anomalies are ranked as 'good', 'fair', or 'poor'.

A functional description of the operation of the Fracture Trend Identification system 80 including the Fracture Trend Identification software 82 of FIG. 2 of the present invention will be set forth in the following paragraphs with reference to FIGS. 1 through 10 of the drawings.

In FIG. 2, when the processor 80*a* of the workstation 80, which represents the 'Fracture Trend Identification System' of the present invention, executes the 'Fracture Trend Identification software 82, the Output Record 84 is recorded or displayed on the Recorder or Display device 80*b* of FIG. 2. An example of the Output Record 84 can be seen in FIGS. 3 and 4 of the drawings, where FIG. 3 is associated with a single 2D seismic line and FIG. 4 is a ribbon posting map used for a number of 2D seismic lines. When the processor 80*a* executes the 'Fracture Trend Identification software 82, a number of steps are executed in sequence. Those steps are discussed below with reference to FIGS. 5 through 10 of the drawings.

In FIGS. 5 through 10, the step of fracture location with compressional seismic, which utilizes the 'Fracture Trend Identification software' 82 of the present invention illustrated in FIG. 5, is an interpretation process for identifying zones of natural, open fractures in the Earth's subsurface using compressional 2-D seismic data.

In FIG. 5, the method practiced by the 'Fracture Trend Identification software' 82 of the present invention begins by creating a GeoFrame/IESX project, loading the available data, and quality controlling the loaded data, step 10. The subsurface formations (i.e., the horizons) that are to be examined are identified on the seismic data by performing a well to seismic tie through the generation of a synthetic, step 20. Frequency anomalies are identified by interpreting the subsurface horizon of interest, extracting seismic attributes for selected zones, posting these values on a ribbon-posting map, and examining them for rapid frequency shifts, step 30. Concurrently, this same procedure is performed for a shallow, near surface horizon in order to identify false positives, step 40. Finally, frequency spectrums from selected locations within the seismic data are extracted and examined in order to confirm the anomalies and rank them, step 50. Zones of low frequency identified in the shallow, near-surface horizon may be related to variations in the seismic source. Since these may propagate to the formations of interest, these are determined to be potential false positives and are removed from consideration. Frequency spectrums allow for the detailing of the specific frequencies involved in and the amount of the frequency shift. This allows for high grading and ranking of the various frequency anomalies.

In FIG. 6, the 'Project Creation, Data Loading and Quality Control' step 10 of the method practiced by the 'Fracture Trend Identification software' 82 is comprised of the following steps. The 'project creation, data loading and quality control' step 10 uses the geoscience software program GeoFrame/IESX. Two GeoFrame/IESX projects are created using the software's utilities set forth in steps 11 and 12 of FIG. 6 (i.e., 'create 2D Geoframe/IESX project 11 and create 3D Geoframe/IESX project' step 12). One of these is used for creating a psuedo 3-D survey of the 2D seismic data in step 12. All seismic lines are then loaded into one project as normal 2-D seismic data along with any well data, such as well logs, deviation survey and check shots in step 13 of FIG. 6 (i.e., 'load 2D seismic data' step 13). Each 2-D seismic line is loaded into the other project as a psuedo 3-D survey in step 14 (i.e., 'load 2D seismic data as 3D survey' step 14). This is accomplished by loading the 2D seismic line as three separate 3-D in-lines to form a single psuedo 3-D survey. This is necessary because the Variance software currently only operates on 3D data. Variance is defined as the direct measurement of dissimilarity between seismic traces rather than the inferred similarity (coherency) of seismic data. The Variance seismic attribute is then extracted (i.e., calculated) for the psuedo-3D seismic survey with the parameters set for the 'in-line' direction only, at step 15 of FIG. 6 (i.e., 'generate Variance sections' step 15). This prevents unwanted influence from cross lines, which are basically the same seismic line. One 'in-line' from each pseudo-3D survey is then exported from the project to SEG-Y formatted files, at step 16 (i.e., 'output Variance sections to SEG-Y format file' step 16). Then, in step 17 ('load Variance sections into 2D GeoFrame/IESX project' step 17), these lines are then loaded into the main GeoFrame/IESX project as Variance class lines of the same seismic data loaded previously in step 13 (i.e., 'load 2D seismic data' step 13). The seismic data in the main project is then quality controlled by examining each version of each seismic line by displaying them to the computer screen, at step 18 (i.e., 'Quality control seismic sections' step 18). A basemap of the 2D project is generated, and the positional relationships of the seismic location data and the well data are examined in order to quality control each item's positional data, at step 19 (i.e., 'build and quality control project basemap' step 19). At this point, the first major phase of the 'Fracture Trend Identification software' 82 process is completed.

In FIG. 7, the 'Horizon Identification' step 20 of the method practiced by the 'Fracture Trend Identification software' 82 is comprised of the following steps. The 'Horizon Identification' step 20 of the 'Fracture Trend Identification software' 82 may be performed in two ways and is dependent upon whether or not well log data is available, specifically sonic and density logs. If these logs are available, the seismic wavelet is extracted from the seismic data about the borehole, at step 21 (i.e., 'extract seismic wavelet' step 21). This wavelet is then convolved with the acoustic impedance log that is generated from the well logs forming a synthetic seismogram, at step 22 (i.e., 'generate synthetic seismograms' step 22). A 'well to seismic tie' is then performed by matching the event characteristics of the synthetic seismogram and the 2d seismic data, at step 23 (i.e., 'perform well to seismic tie' step 23). However, should sonic and density well logs not be available, the most probable seismic event that matches the predicted character, given the area's stratigraphy, is selected as the horizon for analysis, at step 24 (i.e., 'seismic stratigraphy character tie' step 24). At this point, the 'horizon identification' phase of the 'Fracture Trend Identification software' 82 process is completed.

In FIGS. 8 and 11 through 21, refer initially to FIG. 8. Recalling the above discussion with reference to FIGS. 11 through 21, the 'Identify Frequency Anomalies' step 30 of the method practiced by the 'Fracture Trend Identification software' 82 of FIG. 5 is comprised of the following steps. The 'Identify Frequency Anomalies' step 30 begins with the interpretation of the top of the horizon of interest on the 2-D seismic data, step 31 (i.e., 'interpret horizon of interest' step 31). This process is accomplished using the horizon interpretation tools in GeoFrame/IESX. Once completed, the seismic windows from which the dominant frequency will be extracted is determined, step 32 (i.e., 'define window locations' step 32). These will typically be a window of 100 milliseconds in length above the formation of interest, a window of the same length starting below the formation of interest, and multiple windows containing the formation of interest. The 'dominant frequency' of the seismic data within all of these windows is then extracted using the Computational Manager in GeoFrame/IESX, step 33 (i.e., "extract windows' dominant frequency" step 33). The dominant frequency is then plotted on the basemap for each window and plotted, step 34 (i.e. 'generate dominant frequencies ribbon maps' step 34). These maps are then examined for shifts in the dominant frequency that occurs in the formation of interest, step 35 [i.e., 'identify zone(s) of rapid frequency shifts' step 35]. FIGS. 11 through 21 illustrate the effect of open, natural fractures on the dominant frequency attribute. At this point, the 'Identify Frequency Anomalies' step 30 associated with the 'Fracture Trend Identification software' 82 process is completed.

In FIG. 9, the 'False Positive Identification and Removal' step 40 of the method practiced by the 'Fracture Trend Identification software' 82 of the present invention is comprised of the following steps. The 'False Positive Identification and Removal' step 40 of the 'Fracture Trend Identification software' 82 process begins by interpreting a shallow, near-surface seismic event, step 41 (i.e., 'interpret shallow seismic event' step 41). This event is as close to the surface of the Earth as can be selected and still have a good continuous seismic event throughout the seismic line. It is not necessary that this be the same event from seismic line to seismic line. The 'dominant frequency' is extracted from a window of 100 milliseconds in length that is centered on the shallow horizon, step 42 (i.e., "extract shallow event's dominant frequency" step 42). The 'dominant frequency' for this event is then displayed on a ribbon-posting map, step 43 (i.e., 'generate shallow event's dominant frequency ribbon map' step 43). The map is then examined for zones of significantly low dominant frequency, step 44 (i.e., "identify shallow event's low frequency zones" step 44). This shallow event, being close to the surface of the Earth, should contain a frequency distribution that closely approximates the source signature. Little attenuation should have occurred at that point in the seismic due to the influence of the rock formations. Zones of low frequency observed at this shallow event most likely coincide with a strong low frequency seismic source. This could cause false positives in deeper formations with relation to frequency anomalies. Once a low frequency zone for the shallow event has been located, any corresponding low frequency zone in the lower formation(s) of interest are suspected of being false positives and are removed from consideration as open, natural fracture zones. At this point, the 'False Positive Identification and Removal' step 40 of the 'Fracture Trend Identification software' 82 process is completed.

In FIGS. 2, 3, 4, and 10, referring initially to FIG. 10, the 'Anomaly Confirmation and Ranking' step 50 associated with the method practiced by the 'Fracture Trend Identification software' 82 of the present invention is comprised of the following steps. The 'Anomaly Confirmation and Ranking' step 50 of the 'Fracture Trend Identification software' 82 process begins by extracting the frequency spectrum from selected windows of seismic data above, below and including the formation of interest, step 51 (i.e., 'extract frequency spectrum' step 51). These frequency spectra are compared to the zones of low dominant frequency and the amount of frequency attenuation is determined for the various frequency anomalies, step 52 (i.e., 'compare frequency spectrums to attenuation zones' step 52). The locations of the frequency anomalies are then compared to the Variance sections in order to determine if faulting or any other geological feature coincides with the anomalies, step 53 (i.e., 'examine variance sections for faulting and/or folding' step 53). The results of the comparison of the 'dominant frequency' anomalies with the frequency spectrums and the variance sections are used to rank the anomalies, step 54 (i.e., 'high grade anomalies' step 54). Anomalies that have strong shifts in their frequency spectrums and coincide with features observed on the variance sections would be ranked higher than those without those corresponding features. Finally, the locations and trends of the open, natural fracture zones, based on the location of the frequency anomalies and the orientation of the seismic lines, are mapped, step 55 (i.e., 'map anomalies on ribbon posting map' step 55). As a result, when the 'map anomalies on ribbon posting map' step 55 of FIG. 10 is completed, the Output Record 84 of FIG. 4 is generated, the Output Record 84 being recorded and/or displayed on the Recorder or Display device 80b of FIG. 2. Examples of that Output Record 84 are illustrated in FIGS. 3 and 4 of the drawings.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A fracture trend identification method adapted for analyzing compressional 2-D seismic data to identify zones within rock formations containing open natural fractures, comprising the steps of:
   (a) receiving seismic data and identifying zones of faulting in an area of interest;
   (b) identifying seismic events in said seismic data corresponding to a formation of interest;
   (c) extracting seismic attribute data from various zones of said seismic events and identifying frequency anomalies by interpreting the extracted seismic attribute data for the various zones of said seismic events;
   (d) identifying and removing any potential false positive frequency anomalies; and
   (e) confirming any remaining ones of said frequency anomalies not removed during the removing step and ranking the remaining confirmed frequency anomalies.

2. The method of claim 1, wherein the receiving and identifying step (a) comprises the steps of:
   visually quality controlling the received seismic data;
   generating variance sections; and
   examining the variance sections to identify zones of high variance; and
   identifying faulting in the area of interest in response to the examining step.

3. The method of claim 1, wherein the identifying step (b) of identifying seismic events corresponding to a formation of interest comprises the steps of:
   extracting a seismic wavelet, and
   performing a well to seismic tie through the generation of a synthetic.

4. The method of claim 1, wherein the extracting step (c) of extracting seismic attribute data from various zones of said seismic events comprises the step of generating seismic variance and dominant frequency attributes.

5. The method of claim 4, wherein the identifying step (c) of identifying frequency anomalies by interpreting the extracted seismic attribute data for said various zones of said seismic events comprises the steps of:
   posting attribute values on a ribbon posting map; and
   examining these values for rapid shifts in frequencies from higher to lower frequencies.

6. The method of claim 1, wherein the identifying step (d) of identifying and removing any potential false positive frequency anomalies comprises the steps of:
   extracting and examining a dominant frequency for a near surface seismic event; and
   comparing said dominant frequency with the dominant frequencies of the zone(s) of interest.

7. The method of claim 1, wherein the confirming step (e) for confirming any remaining ones of said anomalies not removed during the removing step and ranking the remaining confirmed anomalies comprises the step of:
   extracting and examining the seismic frequency spectrums from selected zones above, below and including any frequency attenuation zones.

8. A program storage device readable by a machine storing a set of instructions executable by the machine to perform method steps for analyzing compressional 2-D seismic data to identify zones within rock formations containing open natural fractures, said method steps comprising:
   (a) receiving seismic data and identifying zones of faulting in an area of interest;
   (b) identifying seismic events in said seismic data corresponding to a formation of interest;
   (c) extracting seismic attribute data from various zones of said seismic events and identifying frequency anomalies by interpreting the extracted seismic attribute data for the various zones of said seismic events;
   (d) identifying and removing any potential false positive frequency anomalies; and
   (e) confirming any remaining ones of said frequency anomalies not removed during the removing step and ranking the remaining confirmed frequency anomalies.

9. The program storage device of claim 8, wherein the receiving and identifying step (a) comprises the steps of:
   visually quality controlling the received seismic data;
   generating variance sections; and
   examining the variance sections to identify zones of high variance; and
   identifying faulting in the area of interest in response to the examining step.

10. The program storage device of claim 8, wherein the identifying step (b) of identifying seismic events corresponding to a formation of interest comprises the steps of:
    extracting a seismic wavelet, and
    performing a well to seismic tie through the generation of a synthetic.

11. The program storage device of claim 8, wherein the extracting step (c) of extracting seismic attribute data from various zones of said seismic events comprises the step of generating seismic variance and dominant frequency attributes.

12. The program storage device of claim 11, wherein the identifying step (c) of identifying frequency anomalies by interpreting the extracted seismic attribute data for said various zones of said seismic events comprises the steps of:
    posting attribute values on a ribbon posting map; and
    examining these values for rapid shifts in frequencies from higher to lower frequencies.

13. The program storage device of claim 8, wherein the identifying step (d) of identifying and removing any potential false positive frequency anomalies comprises the steps of:
    extracting and examining a dominant frequency for a near surface seismic event; and
    comparing said dominant frequency with the dominant frequencies of the zone(s) of interest.

14. The program storage device of claim 8, wherein the confirming step (e) for confirming any remaining ones of said anomalies not removed during the removing step and ranking the remaining confirmed anomalies comprises the step of:
    extracting and examining the seismic frequency spectrums from selected zones above, below and including any frequency attenuation zones.

15. A fracture trend identification system adapted for analyzing compressional 2-D seismic data to identify zones containing open natural fractures, comprising:
    apparatus adapted for identifying seismic events that correspond to a formation of interest;
    apparatus adapted for extracting seismic attribute data from various zones of said seismic events;
    apparatus adapted for identifying frequency anomalies by interpreting the extracted seismic attribute data of said various zones of said seismic events;
    apparatus adapted for identifying and removing any potential false positive frequency anomalies; and
    apparatus adapted for confirming any remaining ones of said anomalies not removed and ranking the confirmed ones of the remaining anomalies.

16. The fracture trend identification system of claim 15, wherein the apparatus adapted for identifying seismic events that corresponds to a formation of interest comprises:
   apparatus adapted for extracting a seismic wavelet, and
   apparatus adapted for performing a well to seismic tie through the generation of a synthetic.

17. The fracture trend identification system of claim 15, wherein the apparatus adapted for extracting seismic attribute data from various zones of said seismic events comprises: apparatus adapted for generating seismic variance and dominant frequency attributes.

18. The fracture trend identification system of claim 15, wherein the apparatus adapted for identifying frequency anomalies by interpreting the extracted seismic attribute data from said various zones of said seismic events comprises:
   apparatus adapted for posting attribute values on a ribbon posting map; and
   apparatus adapted for examining these values for rapid shifts in frequencies from higher to lower frequencies.

19. The fracture trend identification system of claim 15, wherein the apparatus adapted for identifying and removing any potential false positive frequency anomalies comprises:
   apparatus adapted for extracting and examining a Dominant Frequency for a near surface seismic event; and
   apparatus adapted for comparing said Dominant Frequency with the Dominant Frequencies of the zone(s) of interest.

20. The fracture trend identification system of claim 15, wherein the apparatus adapted for confirming any remaining ones of said anomalies not removed and ranking the confirmed ones of the remaining anomalies comprises:
   apparatus adapted for extracting and examining the seismic frequency spectrums from selected zones above, below and including any frequency attenuation zones.

* * * * *